US011067775B2

(12) United States Patent
Huang et al.

(10) Patent No.: US 11,067,775 B2
(45) Date of Patent: Jul. 20, 2021

(54) CAMERA LENS ASSEMBLY

(71) Applicant: Zhejiang Sunny Optical Co., Ltd, Ningbo (CN)

(72) Inventors: Lin Huang, Ningbo (CN); Fujian Dai, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 472 days.

(21) Appl. No.: 16/073,694

(22) PCT Filed: Jul. 19, 2017

(86) PCT No.: PCT/CN2017/093500
§ 371 (c)(1),
(2) Date: Jul. 27, 2018

(87) PCT Pub. No.: WO2018/166128
PCT Pub. Date: Sep. 20, 2018

(65) Prior Publication Data
US 2021/0048626 A1 Feb. 18, 2021

(30) Foreign Application Priority Data

Mar. 13, 2017 (CN) .......................... 201710145892.8
Mar. 13, 2017 (CN) .......................... 201720238759.2

(51) Int. Cl.
*G02B 13/00* (2006.01)
*G02B 9/62* (2006.01)
(52) U.S. Cl.
CPC ........... *G02B 13/0045* (2013.01); *G02B 9/62* (2013.01)

(58) Field of Classification Search
CPC ...... G02B 13/0045; G02B 9/62; G02B 13/00; G02B 13/08
(Continued)

(56) References Cited

U.S. PATENT DOCUMENTS 8,743,482 B1 * 6/2014 Tsai ........................ G02B 9/62
359/757
2012/0229917 A1 * 9/2012 Huang ............... G02B 13/0045
359/713
(Continued)

FOREIGN PATENT DOCUMENTS

CN 204389773 U 6/2015
CN 105425370 A 3/2016
(Continued)

*Primary Examiner* — Mohammed A Hasan
(74) *Attorney, Agent, or Firm* — Hauptman Ham, LLP

(57) ABSTRACT

The present disclosure discloses a camera lens assembly. The camera lens assembly from an object side of the camera lens assembly to an image side sequentially includes: a first lens having a positive refractive power, wherein an object-side surface of the first lens is a convex surface; a second lens having a negative refractive power, wherein an image-side surface of the second lens is a concave surface; a third lens having a refractive power; a fourth lens having a refractive power; a fifth lens having a refractive power; and a sixth lens having a refractive power. A maximum effective radius DT11 of the object-side surface of the first lens and a maximum effective radius DT62 of an image-side surface of the sixth lens satisfy: 0.8<DT11/DT62<1.2. The camera lens assembly of the present disclosure uses has characteristics of long effective focal length, good image quality, and small module size.

19 Claims, 23 Drawing Sheets

(58) Field of Classification Search
USPC .......................................................... 359/757
See application file for complete search history.

(56) References Cited

U.S. PATENT DOCUMENTS

2018/0059377 A1* 3/2018 Fukaya .............. G02B 27/0025
2018/0143406 A1* 5/2018 Wenren .................... G02B 9/62

FOREIGN PATENT DOCUMENTS

| CN | 105807406 A | 7/2016 |
| CN | 106873129 A | 6/2017 |

* cited by examiner

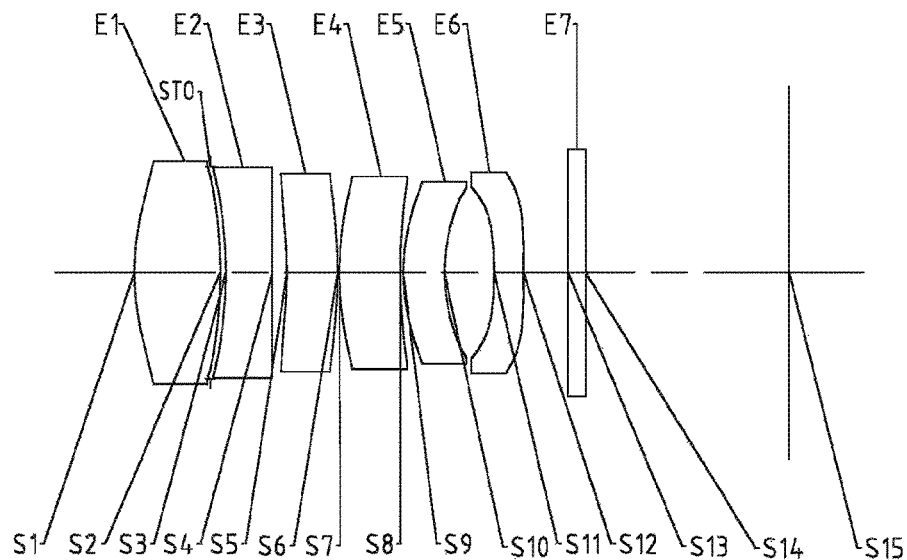
Fig. 1
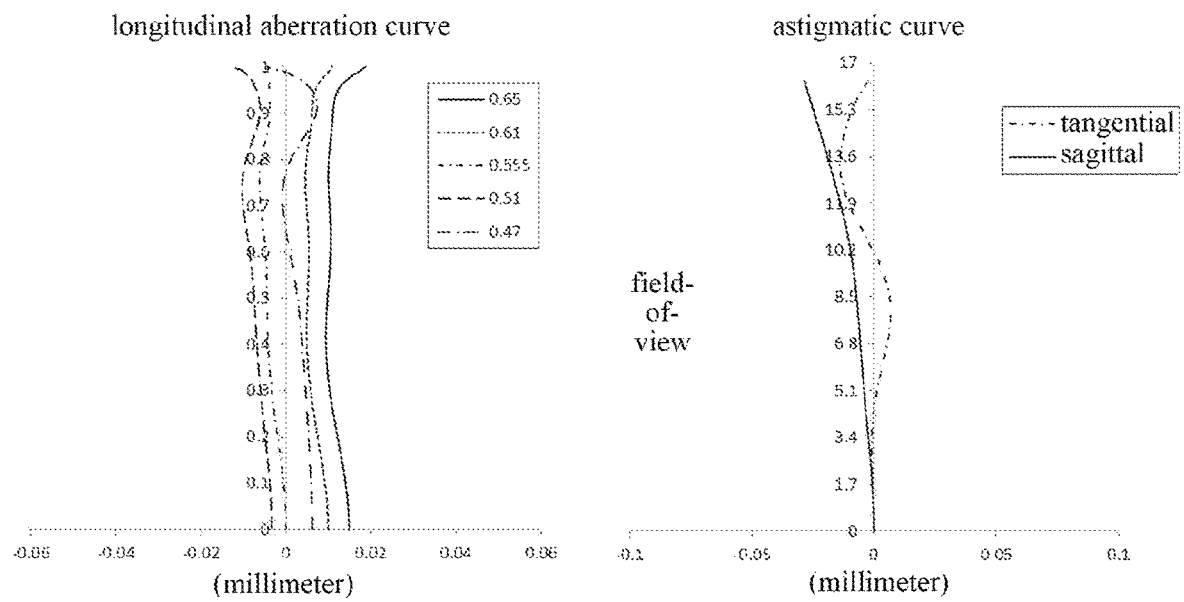
Fig. 2
Fig. 3

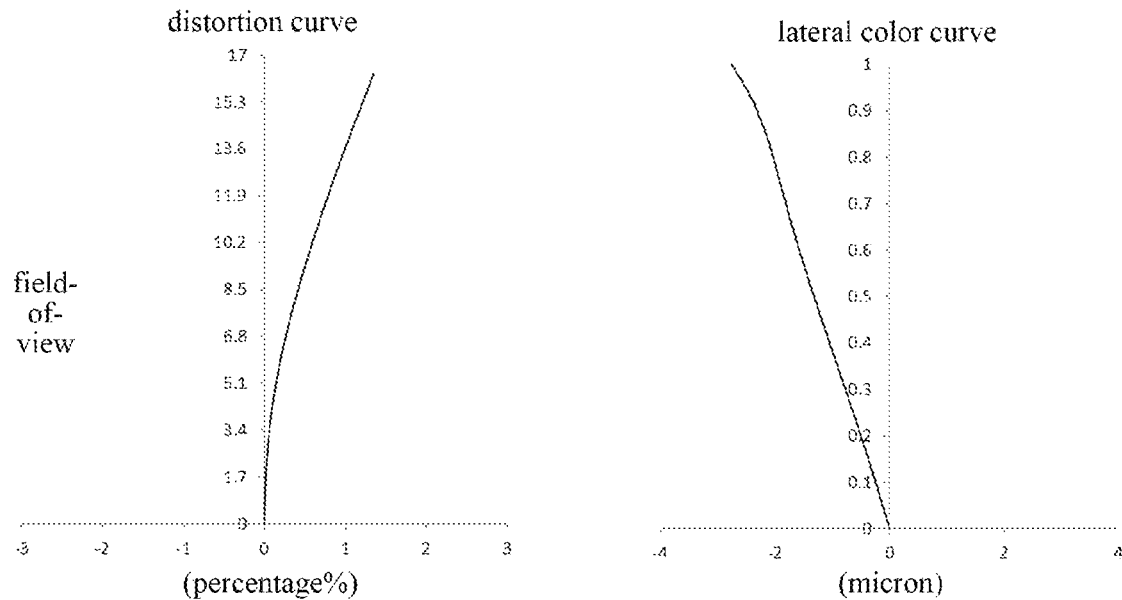
Fig. 4
Fig. 5
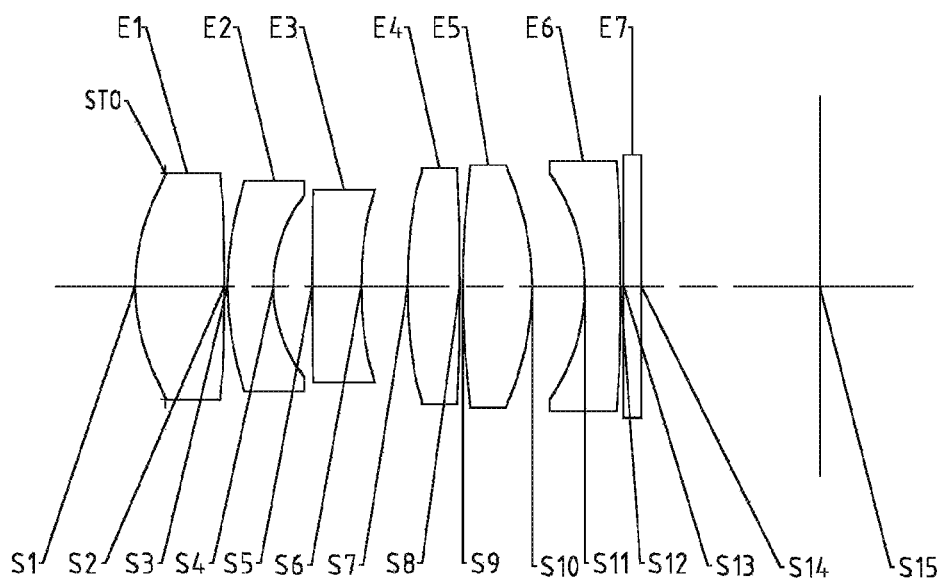
Fig. 6

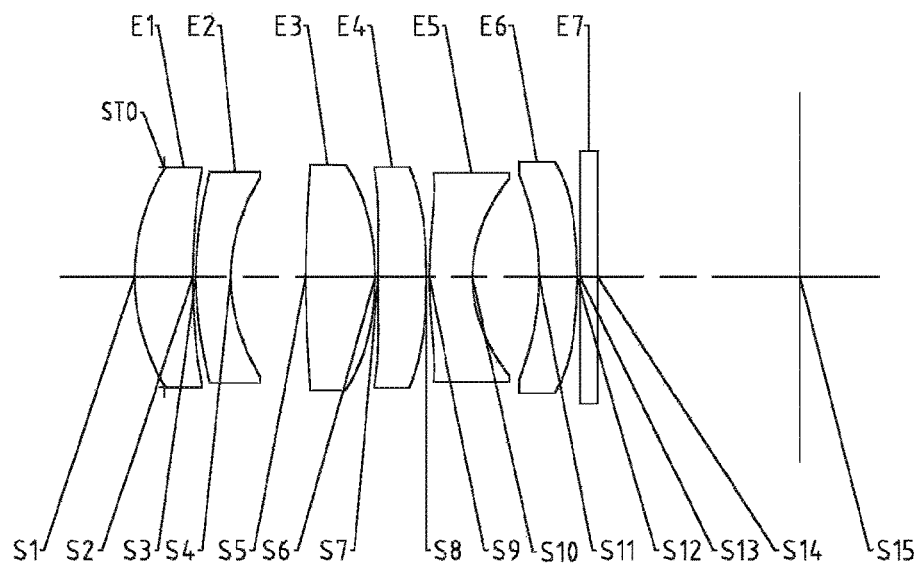
Fig. 21
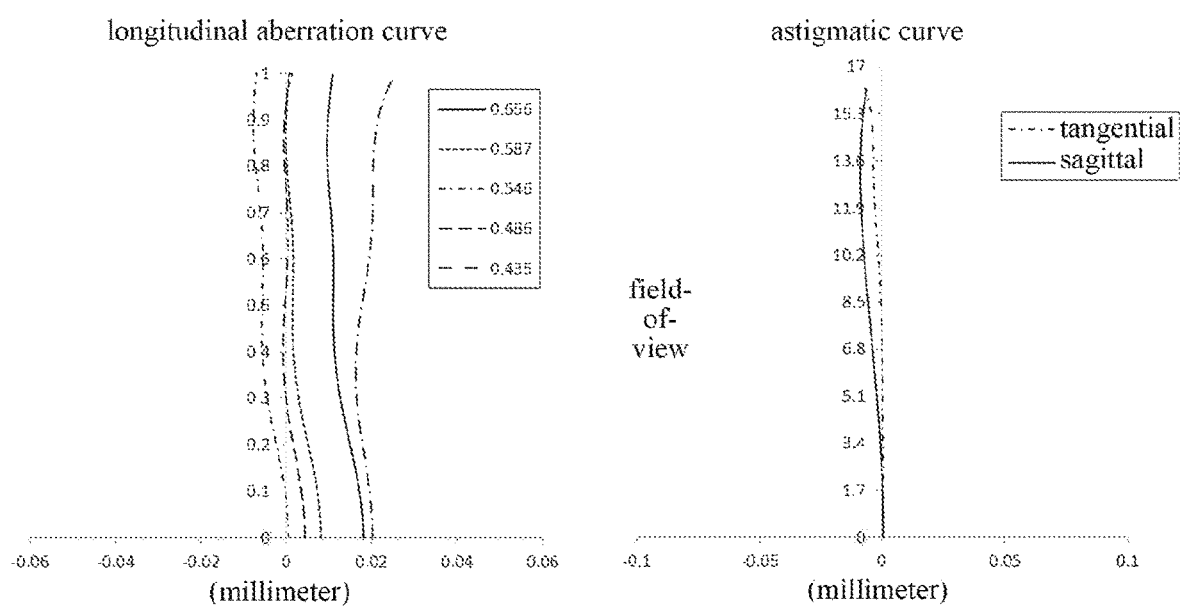
Fig. 22
Fig. 23

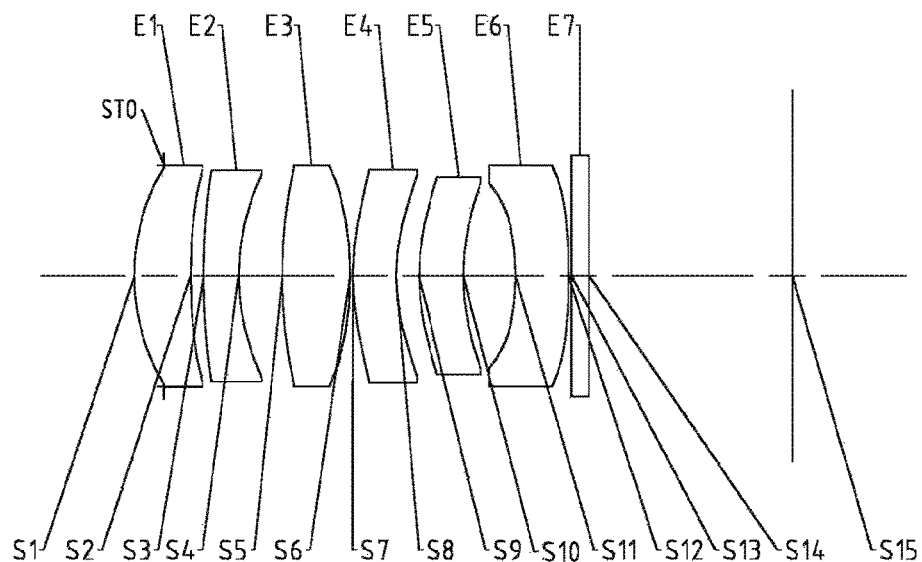
Fig. 31
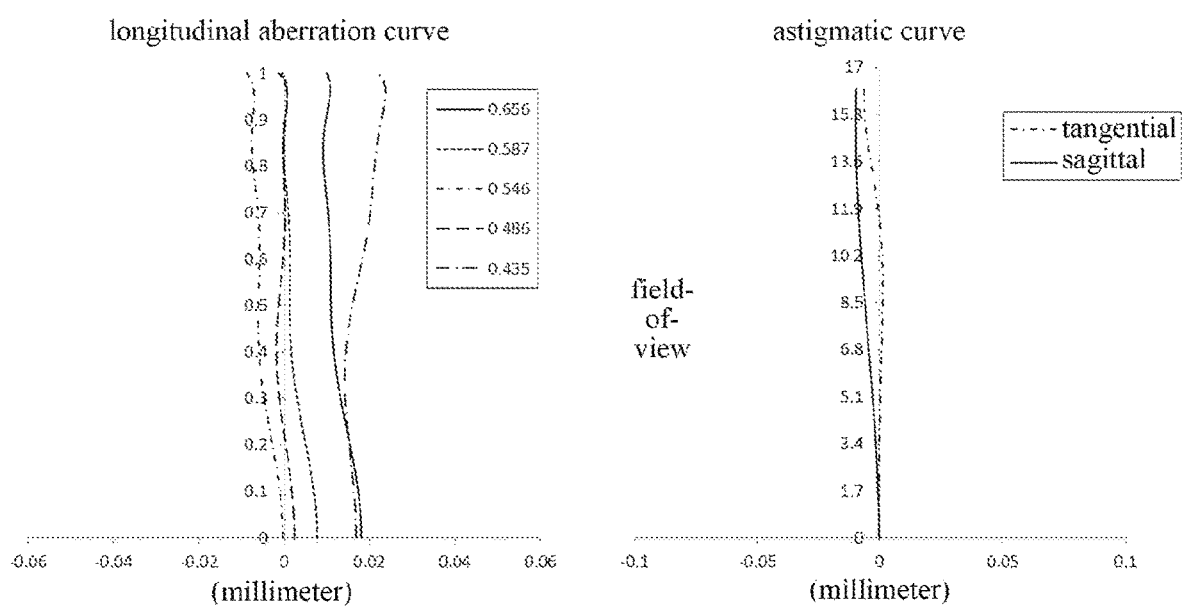
Fig. 32
Fig. 33

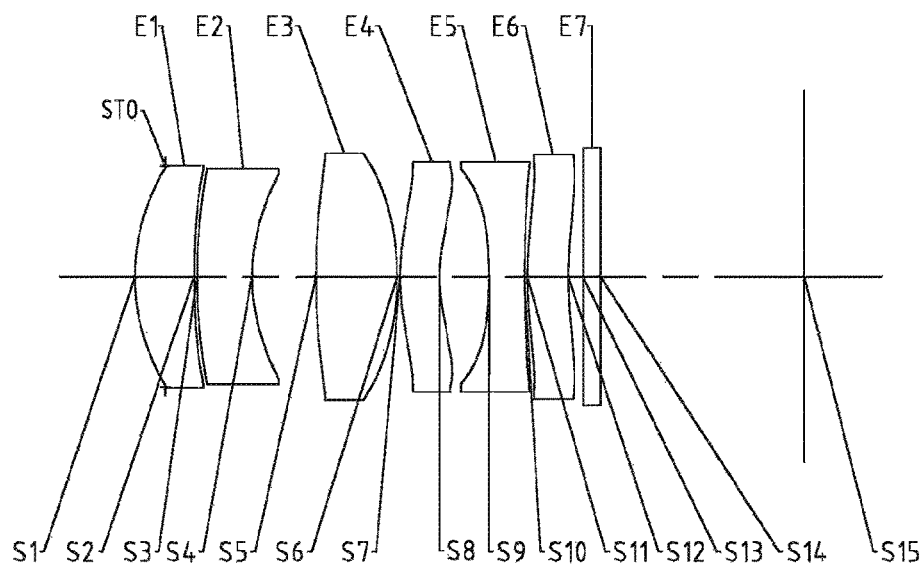
Fig. 41
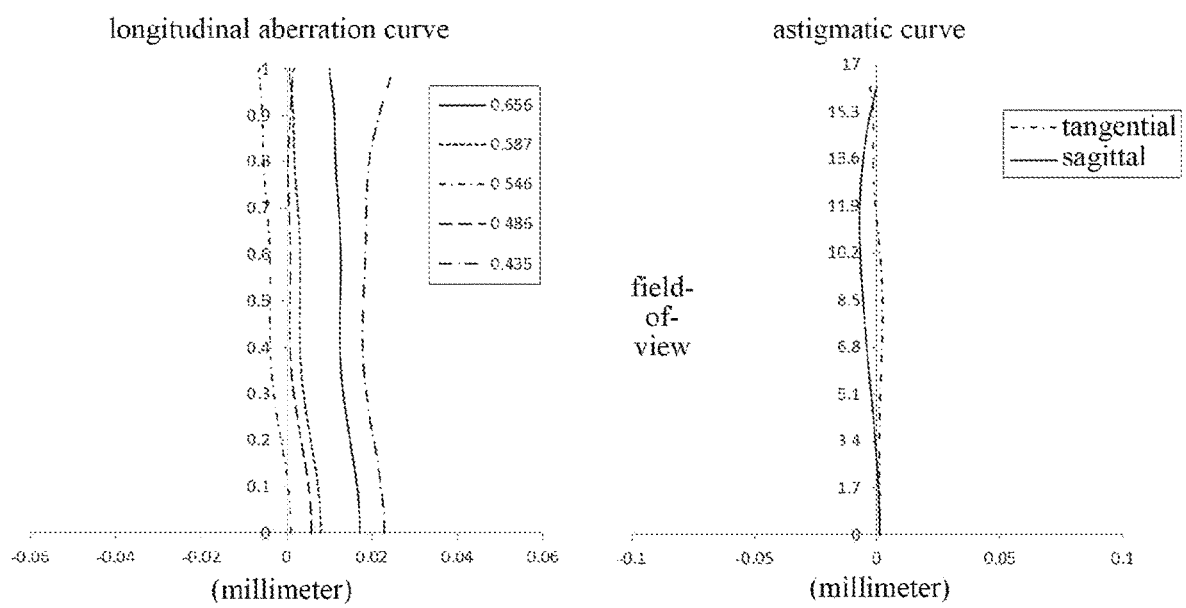
Fig. 42
Fig. 43

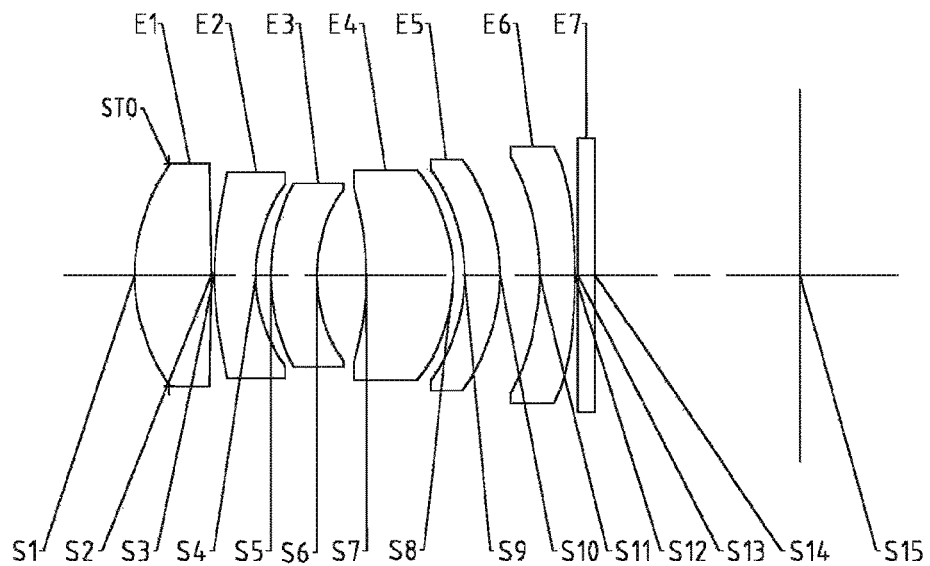
Fig. 51
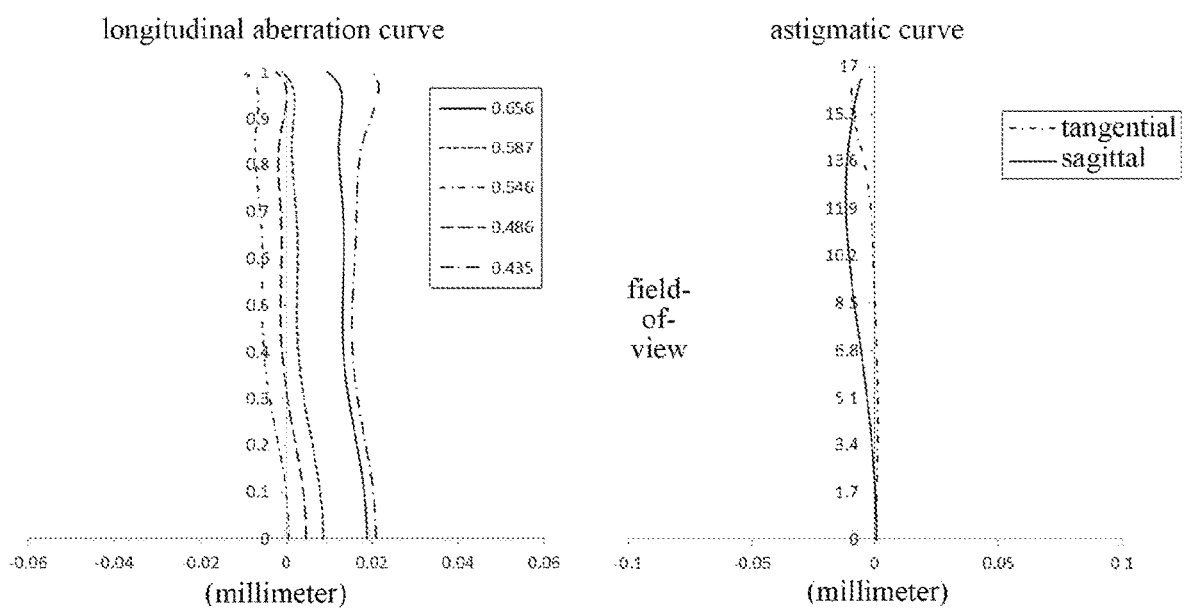
Fig. 52
Fig. 53

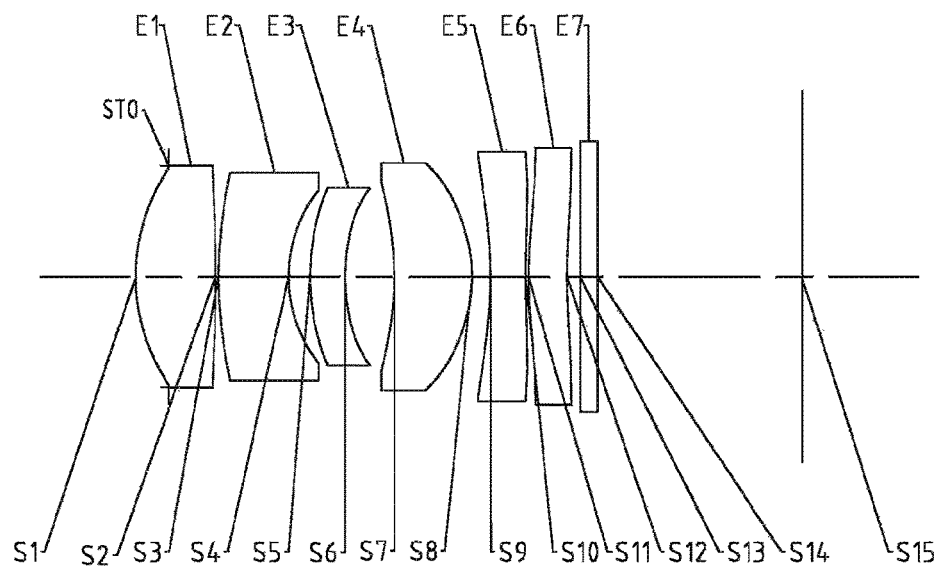
Fig. 61
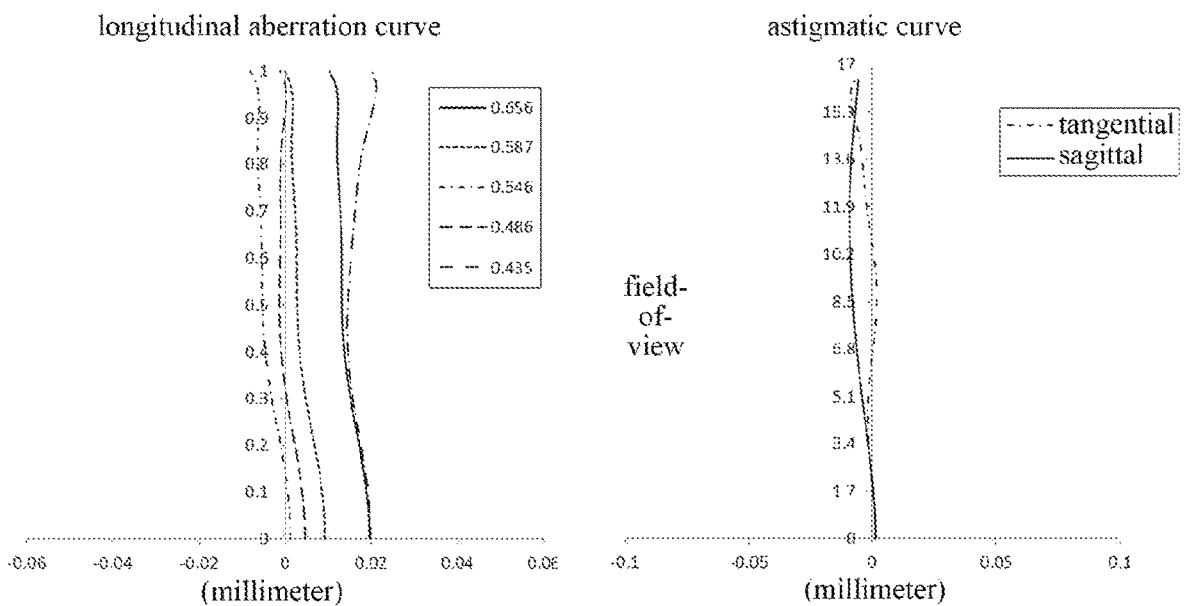
Fig. 62
Fig. 63

CAMERA LENS ASSEMBLY

RELATED APPLICATIONS

The present application is a National Phase of International Application Number PCT/CN2017/093500, filed Jul. 19, 2017, and claims the priority of China Application No. 201710145892.8, filed Mar. 13, 2017; and China Application No. 201720238759.2, filed Mar. 13, 2017.

TECHNICAL FIELD

The present disclosure relates to a camera lens assembly, and specifically to a miniaturized camera lens assembly comprising six lenses.

BACKGROUND

As the science and technology develop, the demand on the image quality of portable electronic products is getting higher, and electronic products such as mobile phones and tablet computers will become thinner and smaller. At present, as the performance of the often used photosensitive elements such as a CCD (charge-coupled device) or CMOS (complementary metal-oxide semiconductor) image sensor are also constantly improving, and their sizes are gradually decreasing, a corresponding camera lens assembly also needs to meet the requirements on high image quality and miniaturization.

In order to miniaturize, it is necessary to reduce the number of lenses of an imaging lens assembly as much as possible. However, the lack of design freedom caused thereby will make it hard to satisfy market demands on the high imaging performance. In addition, current mainstream camera lens assemblies use a wide-angle optical system in order to obtain a wide viewing-angle image. However, it is not conducive to shooting a distant object, and cannot obtain a clear image.

Therefore, the present disclosure aims to provide a miniaturized camera lens assembly having high resolution.

SUMMARY

In order to solve at least some of the problems in the existing technology, the present disclosure provides a camera lens assembly.

According to an aspect of the present disclosure, a camera lens assembly is provided. The camera lens assembly from an object side of the camera lens assembly to an image side sequentially includes a first lens, a second lens, a third lens, a fourth lens, a fifth lens and a sixth lens; and $0.8<DT11/DT62<1.2$, DT11 is a maximum effective radius of an object-side surface of the first lens, and DT62 is a maximum effective radius of an image-side surface of the sixth lens.

According to another aspect of the present disclosure, a camera lens assembly is provided. The camera lens assembly from an object side of the camera lens assembly to an image side sequentially includes a first lens, a second lens, a third lens, a fourth lens, a fifth lens and a sixth lens; and $|(R1-R4)/(R1+R4)|\leq 1.0$, R1 is a radius of curvature of an object-side surface of the first lens, and R4 is a radius of curvature of an image-side surface of the second lens.

According to an implementation of the present disclosure, $HFOV<20°$, and HFOV is half of a maximal field-of-view of the camera lens assembly.

According to an implementation of the present disclosure, $0.25<BFL/TTL<0.5$, BFL is an axial distance from the image-side surface of the sixth lens to an image plane, and TTL is an axial distance from the object-side surface of the first lens to the image plane.

According to an implementation of the present disclosure, $1.5<CTmax/CTmin<3.0$, CTmax is a maximum center thickness of the first to sixth lenses, and CTmin is a minimum center thickness of the first to sixth lenses.

According to an implementation of the present disclosure, $0.5\leq f1/f<1.2$, f1 is an effective focal length of the first lens, and f is an effective focal length of the camera lens assembly.

According to an implementation of the present disclosure, $|f2/f4|<1.5$, f2 is an effective focal length of the second lens, and f4 is an effective focal length of the fourth lens.

According to an implementation of the present disclosure, $|R11|/f\leq 1.5$, R11 is a radius of curvature of an object-side surface of the sixth lens, and f is the effective focal length of the camera lens assembly.

According to an implementation of the present disclosure, $|(R1-R4)/(R1+R4)|\leq 1.0$, R1 is the radius of curvature of the object-side surface of the first lens, and R4 is the radius of curvature of the image-side surface of the second lens.

According to an implementation of the present disclosure, $TTL/f\leq 1.1$, TTL is the axial distance from the object-side surface of the first lens to the image plane, and f is the effective focal length of the camera lens assembly.

According to an implementation of the present disclosure, $f/f12<1.2$, f12 is a combined focal length of the first lens and the second lens, and f is the effective focal length of the camera lens assembly.

The camera lens assembly of the present disclosure uses six plastic aspheric lenses, and has the characteristics of a long effective focal length, good image quality, and small module size.

BRIEF DESCRIPTION OF THE DRAWINGS

By describing non-limiting implementations below in detail with reference to the accompanying drawings, other features, objectives and advantages of the present disclosure will be more apparent. In the accompanying drawings:

FIG. 1 is a schematic structural diagram illustrating a camera lens assembly according to Embodiment 1;

FIGS. 2-5 respectively illustrate a longitudinal aberration curve, an astigmatic curve, a distortion curve and a lateral color curve of the camera lens assembly according to Embodiment 1;

FIG. 6 is a schematic structural diagram illustrating a camera lens assembly according to Embodiment 2;

FIG. 21 is a schematic structural diagram illustrating a camera lens assembly according to Embodiment 5;

FIGS. 22-25 respectively illustrate a longitudinal aberration curve, an astigmatic curve, a distortion curve and a lateral color curve of the camera lens assembly according to Embodiment 5;

FIG. 31 is a schematic structural diagram illustrating a camera lens assembly according to Embodiment 7;

FIGS. 32-35 respectively illustrate a longitudinal aberration curve, an astigmatic curve, a distortion curve and a lateral color curve of the camera lens assembly according to Embodiment 7;

FIG. 41 is a schematic structural diagram illustrating a camera lens assembly according to Embodiment 9;

FIGS. 42-45 respectively illustrate a longitudinal aberration curve, an astigmatic curve, a distortion curve and a lateral color curve of the camera lens assembly according to Embodiment 9;

FIG. 51 is a schematic structural diagram illustrating a camera lens assembly according to Embodiment 11;

FIGS. 52-55 respectively illustrate a longitudinal aberration curve, an astigmatic curve, a distortion curve and a lateral color curve of the camera lens assembly according to Embodiment 11;

FIG. 61 is a schematic structural diagram illustrating a camera lens assembly according to Embodiment 13;

FIGS. 62-65 respectively illustrate a longitudinal aberration curve, an astigmatic curve, a distortion curve and a lateral color curve of the camera lens assembly according to Embodiment 13;

DETAILED DESCRIPTION OF EMBODIMENTS

Figure 7:
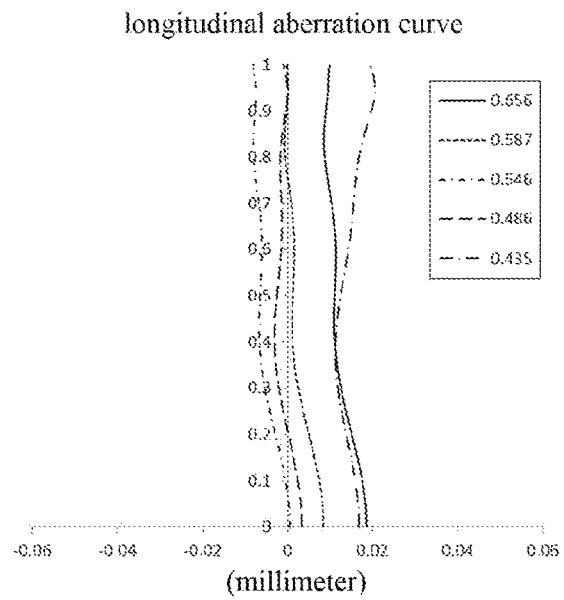
FIGS. 7-10 respectively illustrate a longitudinal aberration curve, an astigmatic curve, a distortion curve and a lateral color curve of the camera lens assembly according to Embodiment 2.

The present disclosure will be further described in detail below with reference to the accompanying drawings and embodiments. It may be understood that the specific embodiments described herein are merely used to explain the related invention rather than limit the invention. It should also be noted that for the convenience of description, only the parts related to the related invention are shown in the accompanying drawings.

It should be understood that in the present disclosure, an element or layer may be directly on another element or layer, or directly connected to or coupled to another element or layer, or there may be an intervening element or layer, when the element or layer is described as being "on," "connected to" or "coupled to" another element or layer. When an element is referred to as being "directly on," "directly connected to" or "directly coupled to" another element or layer, there are no intervening elements or layers. Throughout the specification, the same reference numerals refer to the same elements. The expression "and/or" used in this text includes any and all combinations of one or more of the associated listed items.

It should be understood that although the terms $1^{st}$, $2^{nd}$, or first, second, etc. may be used herein to describe various elements, components, areas, layers, and/or sections, these elements, components, areas, layers, and/or sections should not be limited by these terms. These terms are only used to distinguish one element, component, area, layer or section from another element, component, area, layer or section. Thus, the first element, component, area, layer or section discussed below may be termed the second element, component, area, layer or section without departing from the teachings of the present disclosure.

The terminology used herein is for the purpose of describing specific implementations only and is not intended to limit the present disclosure. As used herein, unless explicitly stated otherwise in the context, a feature that is not limited to the singular or plural form is also intended to include features in plural form. It should be further understood that the terms "comprising," "including," "having" and variants thereof, when used in this specification, specify the presence of stated features, entireties, steps, operations, elements and/or components, but do not exclude the presence or addition of one or more other features, entireties, steps, operations, elements, components and/or combinations thereof. As used herein, the term "and/or" includes any and all combinations of one or more of the associated listed items. Expressions, such as "at least one of," when preceding a list of elements, modify the entire list of elements rather than an individual element in the list. Further, the use of "may," when describing the implementations of the present disclosure, relates to "one or more implementations of the present disclosure." In addition, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

The present disclosure provides a camera lens assembly. The camera lens assembly according to the present disclosure from an object side of the camera lens assembly to an image side is sequentially provided with: a first lens, a second lens, a third lens, a fourth lens, a fifth lens and a sixth lens.

In the embodiments of the present disclosure, the first lens has a positive refractive power, and an object-side surface of the first lens is a convex surface. In the embodiments of the present disclosure, the second lens has a negative refractive power, and an image-side surface of the second lens is a concave surface. In the embodiments of the present disclosure, a maximum effective radius DT11 of the object-side surface of the first lens and a maximum effective radius DT62 of an image-side surface of the sixth lens satisfy: 0.8<DT11/DT62<1.2, and more specifically, satisfy: 0.87≤DT11/DT62≤1.11. A camera lens assembly satisfying the above relationship can compress the lateral size of the lens assembly and reduce the module height.

In the embodiments of the present disclosure, half of a maximal field-of-view HFOV of the camera lens assembly satisfies: HFOV<20°, and more specifically, satisfy: HFOV≤16.6°. By properly setting the value of the half of the maximal field-of-view HFOV of the camera lens assembly, a telephoto function of the camera lens assembly may be realized.

In the embodiments of the present disclosure, an axial distance BFL from the image-side surface of the sixth lens to an image plane and an axial distance TTL from the object-side surface of the first lens to the image plane satisfy: 0.25<BFL/TTL<0.5, and more specifically, satisfy: 0.29≤BFL/TTL≤0.41. A camera lens assembly satisfying the above relationship can ensure the back focal length, which is conducive to the improvement of space and technology.

In the embodiments of the present disclosure, a maximum center thickness CTmax of the first to sixth lenses and a minimum center thickness CTmin of the first to sixth lenses satisfy: 1.5<CTmax/CTmin<3.0, and more specifically, satisfy: 1.87≤CTmax/CTmin≤2.96. By properly setting the relationship between CTmax and CTmin, the thicknesses of the lenses may be evenly distributed, which is conducive to the improvement of space and technology.

In the embodiments of the present disclosure, an effective focal length f1 of the first lens and an effective focal length f of the camera lens assembly satisfy: 0.5≤f1/f<1.2, and more specifically, satisfy: 0.51≤f1/f≤1.16. A camera lens assembly satisfying the above relationship can ensure that the first lens takes a proper positive refractive power, which realizes the telephoto function.

In the embodiments of the present disclosure, an effective focal length f2 of the second lens and an effective focal length f4 of the fourth lens satisfy: |f2/f4|<1.5, and more specifically, satisfy: |f2/f4|≤1.34. With the above configuration, the camera lens assembly can realize a proper refractive power distribution, thereby effectively reducing aberrations.

In the embodiments of the present disclosure, a radius of curvature R11 of an object-side surface of the sixth lens and the effective focal length f of the camera lens assembly satisfy: |R11|/f≤1.5, and more specifically, satisfy: |R11|/f≤1.33. With above configuration, the camera lens assembly can alleviate the incident angle of light of the telephoto lens assembly, and reduce the aberrations.

In the embodiments of the present disclosure, a radius of curvature R1 of the object-side surface of the first lens and a radius of curvature R4 of the image-side surface of the second lens satisfy: |(R1−R4)/(R1+R4)|≤1.0, and more specifically, satisfy: |(R1−R4)/(R1+R4)|≤0.94. With this configuration, it is possible to realize a proper shape matching and reduce the influence of aberrations while the refractive powers of the first lens and the second lens are ensured.

In the embodiments of the present disclosure, the axial distance TTL from the object-side surface of the first lens to the image plane and the effective focal length f of the camera lens assembly satisfy: TTL/f≤1.1, and more specifically, satisfy: TTL/f≤1.08, thus realizing the telephoto size compression.

In the embodiments of the present disclosure, a combined focal length f12 of the first lens and the second lens and the effective focal length f of the camera lens assembly satisfy: f/f12<1.2, and more specifically, satisfy: f/f12≤1.02. With this configuration, the camera lens assembly can realize a proper refractive power distribution, thus realizing the telephoto function.

The present disclosure is further described in detail below in combination with the specific embodiments.

Embodiment 1

First, a camera lens assembly according to Embodiment 1 of the present disclosure is described with reference to FIG. 1 to FIG. 5.

FIG. 1 is a schematic structural diagram illustrating the camera lens assembly of Embodiment 1. As shown in FIG. 1, the camera lens assembly includes six lenses. These six lenses are respectively a first lens E1 having an object-side surface S1 and an image-side surface S2, a second lens E2 having an object-side surface S3 and an image-side surface S4, a third lens E3 having an object-side surface S5 and an image-side surface S6, a fourth lens E4 having an object-side surface S7 and an image-side surface S8, a fifth lens E5 having an object-side surface S9 and an image-side surface S10, and a sixth lens E6 having an object-side surface S11 and an image-side surface S12. The first to sixth lenses E1-E6 are arranged in sequence from an object side to an image side of the camera lens assembly. The first lens E1 may have a positive refractive power, and the object-side surface S1 of the first lens may be a convex surface; and the second lens E2 may have a negative refractive power, and the image-side surface S4 of the second lens may be a concave surface. The camera lens assembly further includes an optical filter E7 having an object-side surface S13 and an image-side surface S14 for filtering infrared light. In this embodiment, light from an object passes through the surfaces S1 to S14 sequentially and is finally imaged on an image plane S15.

In this embodiment, the first to sixth lenses E1 to E6 have their respective effective focal lengths f1 to f6. The first to sixth lenses E1 to E6 are sequentially arranged along an optical axis and collectively determine the total effective focal length f of the camera lens assembly. Table 1 below shows the effective focal lengths f1 to f6 of the first to sixth lenses E1 to E6, the total effective focal length f of the camera lens assembly, the total track length TTL of the camera lens assembly and the half of the maximal field-of-view HFOV of the camera lens assembly.

TABLE 1

| f1(mm) | 5.48 | f(mm) | 10.72 |
| f2(mm) | −9.89 | TTL(mm) | 11.26 |

TABLE 1-continued

| | | | |
|---|---|---|---|
| f3(mm) | −101.36 | HFOV(deg) | 16.4 |
| f4(mm) | 27.48 | | |
| f5(mm) | −179.54 | | |
| f6(mm) | −14.73 | | |

Table 2 shows the surface type, the radius of curvature, the thickness, the material and the conic coefficient of each lens of the camera lens assembly in this Embodiment.

TABLE 2

| surface number | surface type | radius of curvature | thickness | material | conic coefficient |
|---|---|---|---|---|---|
| OBJ | spherical | infinite | infinite | | |
| S1 | aspheric | 4.4607 | 1.4833 | 1.55, 56.1 | −0.8378 |
| S2 | aspheric | −8.0359 | −0.1706 | | −30.6560 |
| STO | spherical | infinite | 0.2706 | | |
| S3 | aspheric | −6.6317 | 0.7966 | 1.64, 23.8 | 0.5736 |
| S4 | aspheric | 145.3467 | 0.2462 | | 50.0000 |
| S5 | aspheric | −5.9513 | 0.8722 | 1.55, 56.1 | −36.7037 |
| S6 | aspheric | −7.0136 | 0.0300 | | −19.3488 |
| S7 | aspheric | 5.6726 | 1.0418 | 1.55, 56.1 | 7.6852 |
| S8 | aspheric | 8.5292 | 0.0500 | | 7.4887 |
| S9 | aspheric | 3.2185 | 0.7169 | 1.64, 23.5 | −1.5314 |
| S10 | aspheric | 2.8581 | 0.8535 | | 0.5049 |
| S11 | aspheric | −14.3117 | 0.5000 | 1.55, 56.1 | 43.5665 |
| S12 | aspheric | 18.5679 | 0.7663 | | −52.3766 |
| S13 | spherical | infinite | 0.3000 | 1.52, 64.2 | |
| S14 | spherical | infinite | 3.5000 | | |
| S15 | spherical | infinite | | | |

Table 3 below shows the higher-order coefficients $A_4, A_6, A_8, A_{10}, A_{12}, A_{14}$ and $A_{16}$ applicable to the aspheric surfaces S1-S12 of the aspheric lenses in this Embodiment.

TABLE 3

| surface number | A4 | A6 | A8 | A10 | A12 | A14 | A16 |
|---|---|---|---|---|---|---|---|
| S1 | −2.4349E−03 | −5.7105E−04 | 7.5026E−05 | −5.8125E−05 | 8.9175E−06 | −1.1902E−06 | 7.4941E−08 |
| S2 | −2.2293E−03 | 2.7295E−04 | −3.2523E−04 | −2.8087E−04 | 1.5479E−04 | −2.9779E−05 | 2.3073E−06 |
| S3 | 7.1785E−03 | −1.2535E−03 | −5.1872E−04 | 2.0046E−04 | 6.2685E−06 | −1.1696E−05 | 1.7665E−06 |
| S4 | 9.1641E−04 | −3.3445E−03 | 7.4725E−04 | 1.2211E−04 | −4.0885E−05 | 9.0198E−07 | 0.0000E+00 |
| S5 | 9.7399E−03 | 7.3044E−04 | −8.9117E−04 | −4.0076E−05 | 1.3081E−04 | −2.7231E−05 | 0.0000E+00 |
| S6 | 1.1777E−02 | −1.3298E−03 | −1.8564E−03 | 7.2464E−04 | −5.3860E−05 | −2.4619E−05 | 3.2952E−06 |
| S7 | −6.6154E−03 | −1.0409E−03 | −2.8268E−03 | 1.5663E−03 | −2.2767E−04 | −1.5855E−05 | 2.1796E−06 |
| S8 | −1.0493E−02 | 5.1707E−03 | −8.5240E−03 | 4.9510E−03 | −6.6943E−04 | −1.7415E−04 | 4.3247E−05 |
| S9 | −1.8379E−02 | 1.3370E−02 | −9.6335E−03 | 4.8096E−03 | −1.2739E−03 | 1.6848E−04 | −1.1966E−05 |
| S10 | −3.4140E−02 | 1.8005E−02 | −4.3275E−03 | 1.0577E−03 | −1.0954E−03 | 6.2061E−04 | −9.4823E−05 |
| S11 | −8.9829E−02 | 1.6736E−02 | −1.8935E−03 | 2.4406E−03 | −3.4288E−03 | 1.4778E−03 | −2.0812E−04 |
| S12 | −6.9353E−02 | 2.1008E−02 | −7.9878E−03 | 3.6990E−03 | −1.7164E−03 | 4.6488E−04 | −5.2374E−05 |

FIG. 2 shows a longitudinal aberration curve of the camera lens assembly according to Embodiment 1, representing deviations of focal points of light of different wavelengths converged after passing through an optical system. FIG. 3 shows an astigmatic curve of the camera lens assembly according to Embodiment 1, representing a curvature of a tangential image plane and a curvature of a sagittal image plane. FIG. 4 shows a distortion curve of the camera lens assembly according to Embodiment 1, representing amounts of distortion at different viewing angles. FIG. 5 shows a lateral color curve of the camera lens assembly according to Embodiment 1, representing deviations of different image heights on an image plane after light passes through the camera lens assembly. In summary and referring to FIG. 2 to FIG. 5, it may be seen that the camera lens assembly according to Embodiment 1 is a miniaturized camera lens assembly having high resolution.

Embodiment 2

A camera lens assembly according to Embodiment 2 of the present disclosure is described below with reference to FIG. 6 to FIG. 10. In addition to the parameters of the lenses of the camera lens assembly, for example, in addition to the radius of curvature, the thickness, the material, the conic coefficient, the effective focal length and the axial spacing distance of each lens, and the higher-order coefficients of each lens, camera lens assemblies described in Embodiment 2 and the following embodiments are the same in arrangement and structure as that of the camera lens assembly described in Embodiment 1. In this embodiment and the following embodiments, for the purpose of brevity, the description of parts similar to those in Embodiment 1 will be omitted.

FIG. 6 is a schematic structural diagram illustrating the camera lens assembly of Embodiment 2. The camera lens assembly from an object side to an image side sequentially includes a first lens E1, a second lens E2, a third lens E3, a fourth lens E4, a fifth lens E5, and a sixth lens E6.

Table 4 below shows the effective focal lengths f1 to f6 of the first to sixth lenses E1 to E6, the total effective focal length f of the camera lens assembly, the total track length TTL of the camera lens assembly and the half of the maximal field-of-view HFOV of the camera lens assembly.

TABLE 4

| | | | |
|---|---|---|---|
| f1(mm) | 6.04 | f(mm) | 10.69 |
| f2(mm) | −8.44 | TTL(mm) | 11.50 |
| f3(mm) | −11.95 | HFOV(deg) | 16.6 |

TABLE 4-continued

| | |
|---|---|
| f4(mm) | 17.67 |
| f5(mm) | 5.74 |
| f6(mm) | −5.44 |

Table 5 shows the surface type, the radius of curvature, the thickness, the material and the conic coefficient of each lens of the camera lens assembly in this Embodiment.

TABLE 5

| surface number | surface type | radius of curvature | thickness | material | conic coefficient |
|---|---|---|---|---|---|
| OBJ | spherical | infinite | infinite | | |
| STO | spherical | infinite | −0.5073 | | |
| S1 | aspheric | 3.4579 | 1.5000 | 1.55, 56.1 | −0.1694 |

TABLE 5-continued

| surface number | surface type | radius of curvature | thickness | material | conic coefficient |
|---|---|---|---|---|---|
| S2 | aspheric | −62.2021 | 0.0500 | | 50.0000 |
| S3 | aspheric | 4.9933 | 0.7716 | 1.65, 23.5 | −0.1515 |
| S4 | aspheric | 2.4487 | 0.6498 | | −0.1063 |
| S5 | aspheric | 66.7627 | 0.8268 | 1.65, 23.5 | −99.0000 |
| S6 | aspheric | 6.8878 | 0.7811 | | 2.3230 |
| S7 | aspheric | 10.6542 | 0.8728 | 1.55, 56.1 | 8.0222 |
| S8 | aspheric | −100.2609 | 0.0500 | | 50.0000 |
| S9 | aspheric | 16.7326 | 1.1688 | 1.65, 23.5 | 35.9267 |
| S10 | aspheric | −4.6374 | 0.8790 | | −0.3474 |
| S11 | aspheric | −3.5307 | 0.6000 | 1.65, 23.5 | 0.7600 |
| S12 | aspheric | 813.6540 | 0.0501 | | 50.0000 |
| S13 | spherical | infinite | 0.3000 | 1.52, 64.2 | |
| S14 | spherical | infinite | 3.0016 | | |
| S15 | spherical | infinite | | | |

Table 6 below shows the higher-order coefficients $A_4$, $A_6$, $A_8$, $A_{10}$ and $A_{12}$ applicable to the aspheric surfaces S1-S12 of the aspheric lenses in this Embodiment.

TABLE 6

| surface number | A4 | A6 | A8 | A10 | A12 |
|---|---|---|---|---|---|
| S1 | −5.9756E−04 | −2.6665E−04 | −4.3403E−05 | 1.3947E−06 | −3.3333E−06 |
| S2 | −3.6747E−04 | −7.9811E−04 | −7.4451E−05 | −6.7525E−06 | 1.9947E−06 |
| S3 | −5.3449E−03 | 7.4750E−04 | −2.7726E−05 | −5.5493E−05 | 1.2005E−05 |
| S4 | −9.7773E−03 | 2.7066E−03 | 1.5149E−04 | 1.3455E−04 | 2.2940E−05 |
| S5 | −6.5011E−03 | 1.4260E−03 | 6.6242E−04 | 2.9183E−05 | −1.4056E−05 |
| S6 | −1.3381E−03 | 1.9353E−03 | 2.8185E−04 | 3.2732E−05 | −5.2667E−05 |
| S7 | 7.5597E−04 | 6.4849E−04 | 1.8271E−04 | −4.3770E−05 | −1.6737E−07 |
| S8 | −1.5722E−03 | 2.2414E−04 | −1.7930E−05 | 6.0800E−06 | −3.1685E−06 |
| S9 | 6.4173E−04 | −4.0468E−04 | −2.2385E−05 | 1.4841E−06 | 1.1759E−06 |
| S10 | 3.0908E−03 | −8.8287E−04 | 3.6025E−05 | 8.2312E−06 | 1.6217E−06 |
| S11 | −1.3364E−03 | −2.0162E−05 | 1.3452E−04 | 1.7381E−05 | −7.4338E−07 |
| S12 | −6.7518E−03 | 7.8110E−04 | 4.2999E−07 | −4.8755E−06 | 4.2002E−07 |

Figure 8:
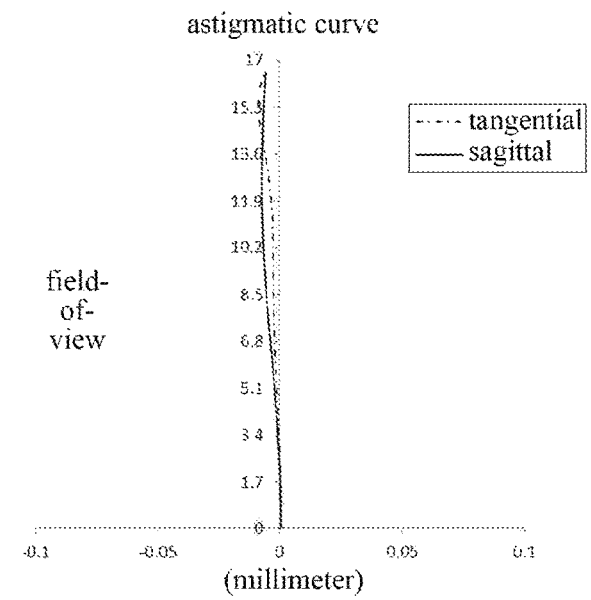
Figure 9:
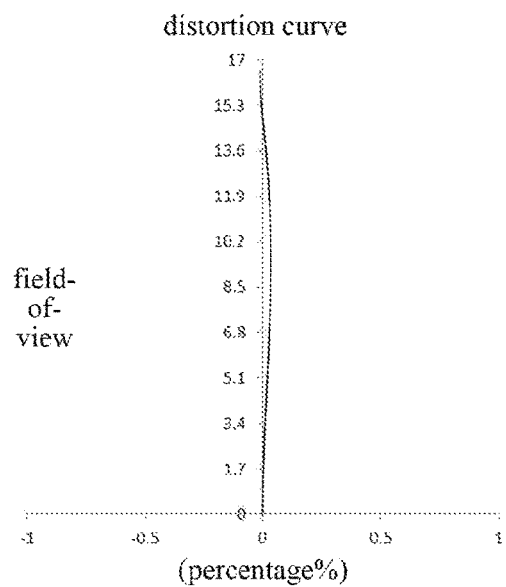
Figure 10:
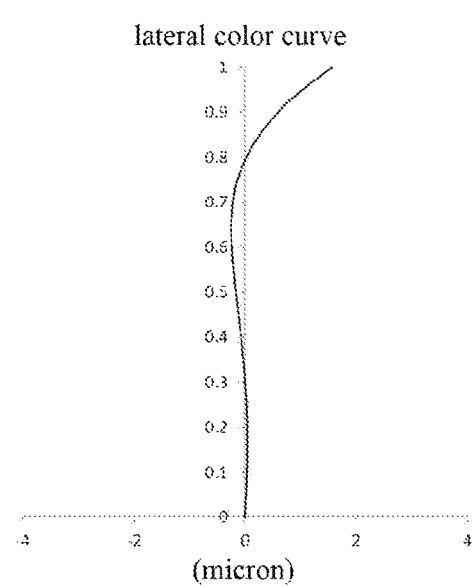

FIG. 7 shows a longitudinal aberration curve of the camera lens assembly according to Embodiment 2, representing deviations of focal points of light of different wavelengths converged after passing through an optical system. FIG. 8 shows an astigmatic curve of the camera lens assembly according to Embodiment 2, representing a curvature of a tangential image plane and a curvature of a sagittal image plane. FIG. 9 shows a distortion curve of the camera lens assembly according to Embodiment 2, representing amounts of distortion at different viewing angles. FIG. 10 shows a lateral color curve of the camera lens assembly according to Embodiment 2, representing deviations of different image heights on an image plane after light passes through the camera lens assembly. In summary and referring to FIG. 7 to FIG. 10, it may be seen that the camera lens assembly according to Embodiment 2 is a miniaturized camera lens assembly having high resolution.

Embodiment 3

A camera lens assembly according to Embodiment 3 of the present disclosure is described below with reference to FIG. 11 to FIG. 15.

Figure 11:
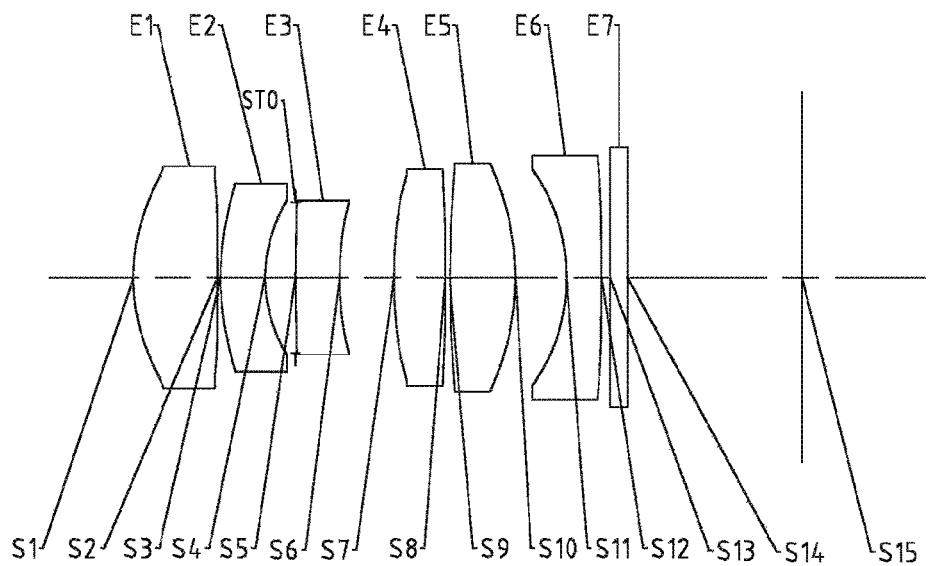
FIG. 11 is a schematic structural diagram illustrating a camera lens assembly according to Embodiment 3.

FIG. 11 is a schematic structural diagram illustrating the camera lens assembly of Embodiment 3. The camera lens assembly from an object side to an image side sequentially includes a first lens E1, a second lens E2, a third lens E3, a fourth lens E4, a fifth lens E5, and a sixth lens E6.

Table 7 below shows the effective focal lengths f1 to f6 of the first to sixth lenses E1 to E6, the total effective focal length f of the camera lens assembly, the total track length TTL of the camera lens assembly and the half of the maximal field-of-view HFOV of the camera lens assembly.

TABLE 7

| f1(mm) | 6.15 | f(mm) | 10.69 |
|---|---|---|---|
| f2(mm) | −8.79 | TTL(mm) | 11.50 |
| f3(mm) | −11.42 | HFOV(deg) | 16.6 |
| f4(mm) | 15.38 | | |
| f5(mm) | 5.79 | | |
| f6(mm) | −5.34 | | |

Table 8 shows the surface type, the radius of curvature, the thickness, the material and the conic coefficient of each lens of the camera lens assembly in this Embodiment.

TABLE 8

| surface number | surface type | radius of curvature | thickness | material | conic coefficient |
|---|---|---|---|---|---|
| OBJ | spherical | infinite | infinite | | |
| S1 | aspheric | 3.4386 | 1.4533 | 1.55, 56.1 | −0.1662 |
| S2 | aspheric | −129.3288 | 0.0500 | | 50.0000 |
| S3 | aspheric | 4.7693 | 0.7626 | 1.65, 23.5 | −0.1359 |
| S4 | aspheric | 2.4301 | 0.5226 | | −0.1414 |
| STO | spherical | infinite | 0.0000 | | |
| S5 | aspheric | 27.5750 | 0.7595 | 1.65, 23.5 | −99.0000 |
| S6 | aspheric | 5.7586 | 0.9325 | | 2.6622 |
| S7 | aspheric | 9.2762 | 0.8781 | 1.55, 56.1 | 8.5770 |
| S8 | aspheric | −86.6267 | 0.0819 | | 50.0000 |
| S9 | aspheric | 20.0154 | 1.1363 | 1.65, 23.5 | 36.5679 |
| S10 | aspheric | −4.4943 | 0.8732 | | −0.2616 |
| S11 | aspheric | −3.4834 | 0.6000 | 1.65, 23.5 | 0.8156 |
| S12 | aspheric | 396.6307 | 0.1501 | | −99.0000 |
| S13 | spherical | infinite | 0.3000 | 1.52, 64.2 | |
| S14 | spherical | infinite | 3.0009 | | |
| S15 | spherical | infinite | | | |

Table 9 below shows the higher-order coefficients $A_4$, $A_6$, $A_8$, $A_{10}$ and $A_{12}$ applicable to the aspheric surface S1-S12 of the aspheric lenses in this Embodiment.

TABLE 9

| surface number | A4 | A6 | A8 | A10 | A12 |
|---|---|---|---|---|---|
| S1 | −5.6653E−04 | −2.6985E−04 | −4.6866E−05 | 9.1108E−07 | −3.5533E−06 |
| S2 | −5.2215E−04 | −8.3898E−04 | −8.0109E−05 | −5.4395E−06 | 2.2598E−06 |
| S3 | −5.3237E−03 | 7.3249E−04 | −2.5395E−05 | −5.5054E−05 | 1.4650E−05 |
| S4 | −1.0350E−02 | 2.7701E−03 | 7.7200E−05 | 1.7863E−04 | 4.3434E−05 |
| S5 | −6.6804E−03 | 1.2344E−03 | 6.3019E−04 | 2.3118E−05 | −1.5318E−05 |
| S6 | −1.1266E−03 | 1.9642E−03 | 2.4820E−04 | −9.1534E−06 | −6.8688E−05 |
| S7 | 9.0292E−04 | 6.9681E−04 | 1.6248E−04 | −5.3629E−05 | 1.8011E−06 |
| S8 | −2.1255E−03 | 2.0878E−04 | −2.9776E−06 | 7.5894E−06 | −3.8373E−06 |
| S9 | 6.8290E−04 | −4.1333E−04 | −2.5162E−05 | 2.2736E−06 | 1.3246E−06 |
| S10 | 2.9384E−03 | −8.7101E−04 | 3.8555E−05 | 7.6061E−06 | 2.0015E−06 |
| S11 | −2.0203E−03 | −7.6542E−05 | 1.4220E−04 | 2.0413E−05 | −4.0613E−07 |
| S12 | −6.9247E−03 | 7.5953E−04 | 2.4331E−06 | −4.7762E−06 | 4.4634E−07 |

Figure 12:
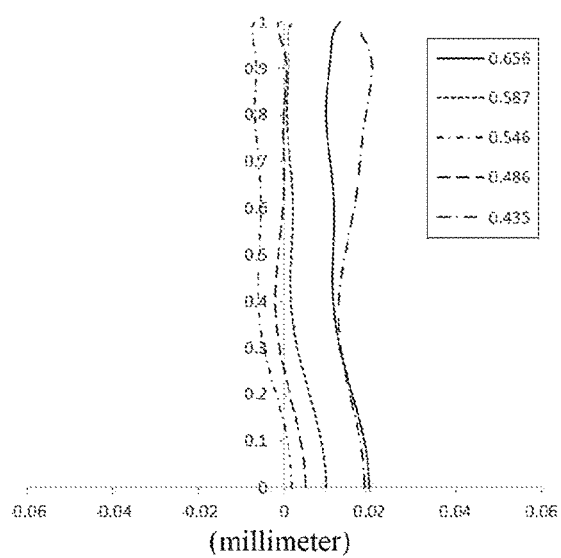
FIGS. 12-15 respectively illustrate a longitudinal aberration curve, an astigmatic curve, a distortion curve and a lateral color curve of the camera lens assembly according to Embodiment 3.
Figure 13:
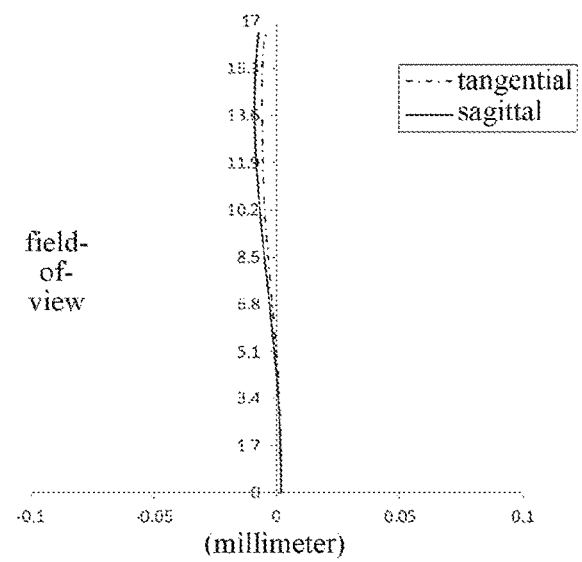
Figure 14:
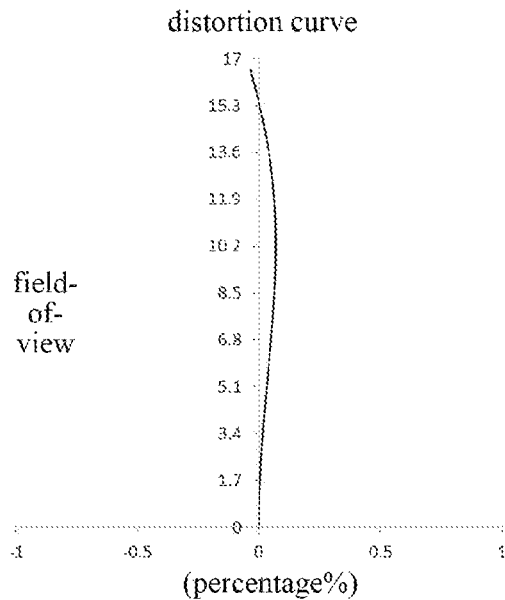
Figure 15:
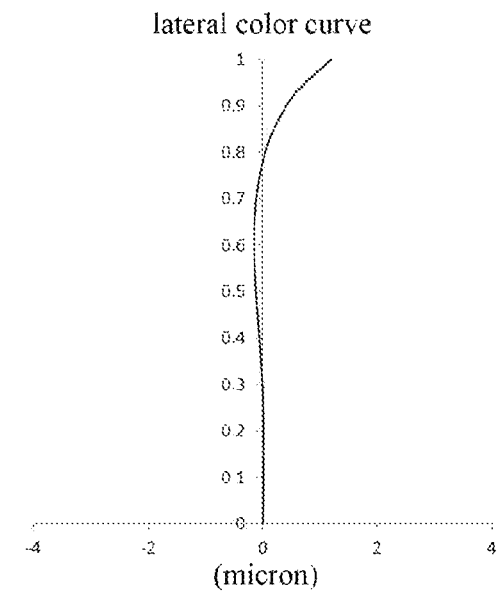

FIG. 12 shows a longitudinal aberration curve of the camera lens assembly according to Embodiment 3, representing deviations of focal points of light of different wavelengths converged after passing through an optical system. FIG. 13 shows an astigmatic curve of the camera lens assembly according to Embodiment 3, representing a curvature of a tangential image plane and a curvature of a sagittal image plane. FIG. 14 shows a distortion curve of the camera lens assembly according to Embodiment 3, representing amounts of distortion at different viewing angles. FIG. 15 shows a lateral color curve of the camera lens assembly according to Embodiment 3, representing deviations of different image heights on an image plane after light passes through the camera lens assembly. In summary and referring to FIG. 12 to FIG. 15, it may be seen that the camera lens assembly according to Embodiment 3 is a miniaturized camera lens assembly having high resolution.

Embodiment 4

A camera lens assembly according to Embodiment 4 of the present disclosure is described below with reference to FIG. 16 to FIG. 20.

Figure 16:
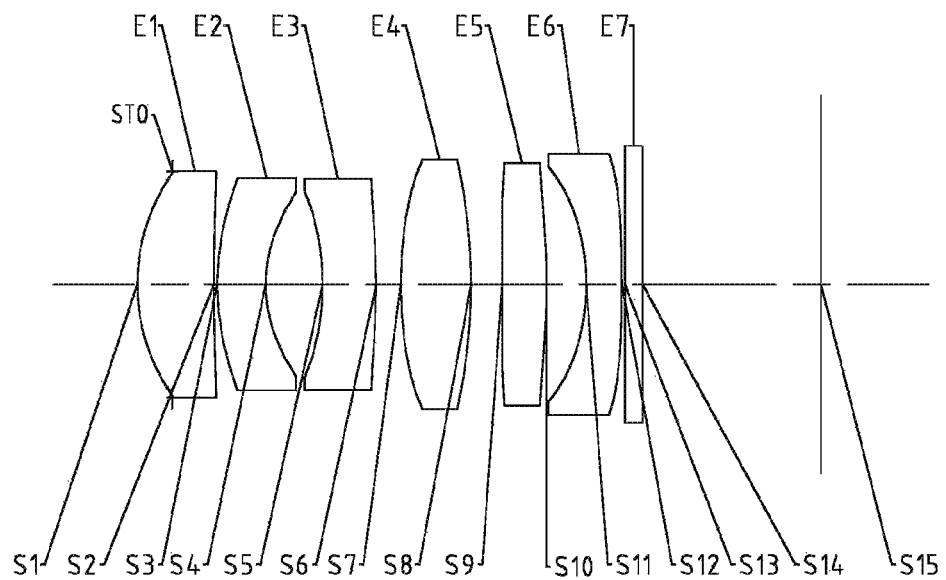
FIG. 16 is a schematic structural diagram illustrating a camera lens assembly according to Embodiment 4.

FIG. 16 is a schematic structural diagram illustrating the camera lens assembly of Embodiment 4. The camera lens assembly from an object side to an image side sequentially includes a first lens E1, a second lens E2, a third lens E3, a fourth lens E4, a fifth lens E5, and a sixth lens E6.

Table 10 below shows the effective focal lengths f1 to f6 of the first to sixth lenses E1 to E6, the total effective focal length f of the camera lens assembly, the total track length TTL of the camera lens assembly and the half of the maximal field-of-view HFOV of the camera lens assembly.

TABLE 10

| f1(mm) | 6.32 | f(mm) | 10.70 |
|---|---|---|---|
| f2(mm) | −10.21 | TTL(mm) | 11.50 |
| f3(mm) | −10.94 | HFOV(deg) | 16.6 |
| f4(mm) | 7.63 | | |
| f5(mm) | 17.72 | | |
| f6(mm) | −7.86 | | |

Table 11 below shows the surface type, the radius of curvature, the thickness, the material and the conic coefficient of each lens of the camera lens assembly in this Embodiment.

TABLE 11

| surface number | surface type | radius of curvature | thickness | material | conic coefficient |
|---|---|---|---|---|---|
| OBJ | spherical | infinite | infinite | | |
| STO | spherical | infinite | −0.5917 | | |
| S1 | aspheric | 3.2718 | 1.2907 | 1.55, 56.1 | 0.0131 |
| S2 | aspheric | 52.9549 | 0.0508 | | 50.0000 |
| S3 | aspheric | 4.3698 | 0.8190 | 1.65, 23.5 | 0.4128 |
| S4 | aspheric | 2.4349 | 0.9577 | | −0.0469 |
| S5 | aspheric | −4.5855 | 0.9005 | 1.65, 23.5 | 1.5778 |
| S6 | aspheric | −14.0586 | 0.4133 | | 32.9372 |
| S7 | aspheric | 7.6127 | 1.1850 | 1.55, 56.1 | 1.2905 |
| S8 | aspheric | −8.7201 | 0.5207 | | −9.8541 |
| S9 | aspheric | −163.1643 | 0.7457 | 1.65, 23.5 | −99.0000 |
| S10 | aspheric | −10.7172 | 0.6667 | | −6.2335 |
| S11 | aspheric | −3.7947 | 0.6000 | 1.55, 56.1 | 0.1823 |
| S12 | aspheric | −34.2173 | 0.0500 | | 50.0000 |
| S13 | spherical | infinite | 0.3000 | 1.52, 64.2 | |
| S14 | spherical | infinite | 3.0009 | | |
| S15 | spherical | infinite | | | |

Table 12 below shows the higher-order coefficients $A_4$, $A_6$, $A_8$, $A_{10}$ and $A_{12}$ applicable to the aspheric surfaces S1-S12 of the aspheric lenses in this Embodiment.

TABLE 12

| surface number | A4 | A6 | A8 | A10 | A12 |
|---|---|---|---|---|---|
| S1 | 1.3060E−04 | −6.6577E−05 | 7.5873E−06 | 1.3986E−06 | −7.5601E−07 |
| S2 | 6.4111E−04 | 1.2336E−05 | 2.5833E−06 | 1.4421E−06 | −1.5750E−06 |
| S3 | −5.1413E−03 | 1.8154E−04 | 3.6266E−05 | −2.4716E−06 | −2.4938E−07 |
| S4 | −6.8213E−03 | 1.0965E−05 | −1.2729E−04 | 5.0733E−05 | −5.1914E−06 |
| S5 | −9.4652E−04 | −5.6831E−04 | 5.0636E−05 | −2.7882E−06 | 1.2966E−06 |
| S6 | −1.6607E−04 | 5.3349E−04 | 1.7017E−04 | 5.2626E−05 | −1.6322E−07 |
| S7 | 3.9591E−04 | 2.9788E−04 | 9.9665E−05 | 1.7050E−05 | −4.9510E−06 |
| S8 | −7.5319E−04 | 1.8025E−04 | 4.4757E−05 | −1.1710E−05 | −2.8978E−06 |
| S9 | 1.3965E−03 | 3.2863E−04 | 4.2444E−05 | 1.6706E−06 | −2.7342E−06 |
| S10 | 4.1717E−03 | −6.6635E−05 | −1.3059E−06 | 2.1101E−06 | 1.0487E−06 |
| S11 | −1.1039E−03 | −6.6701E−04 | −7.0980E−05 | 6.2008E−06 | 2.2965E−07 |
| S12 | −5.7148E−03 | −8.4863E−05 | 1.9790E−05 | 1.7425E−07 | −1.5183E−07 |

Figure 17:
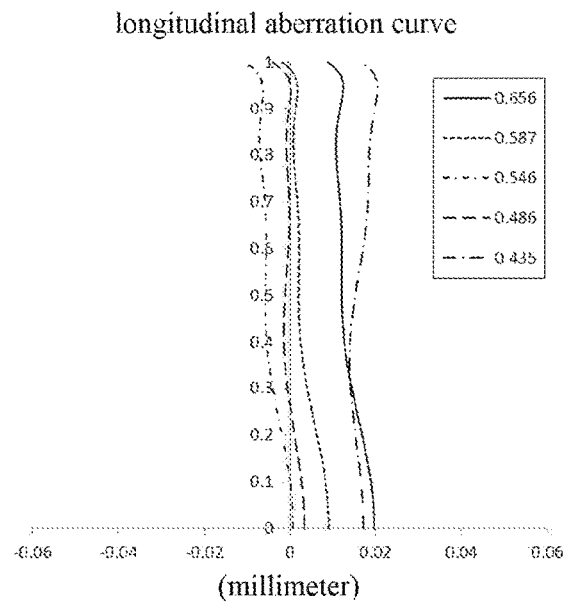
FIGS. 17-20 respectively illustrate a longitudinal aberration curve, an astigmatic curve, a distortion curve and a lateral color curve of the camera lens assembly according to Embodiment 4.
Figure 18:
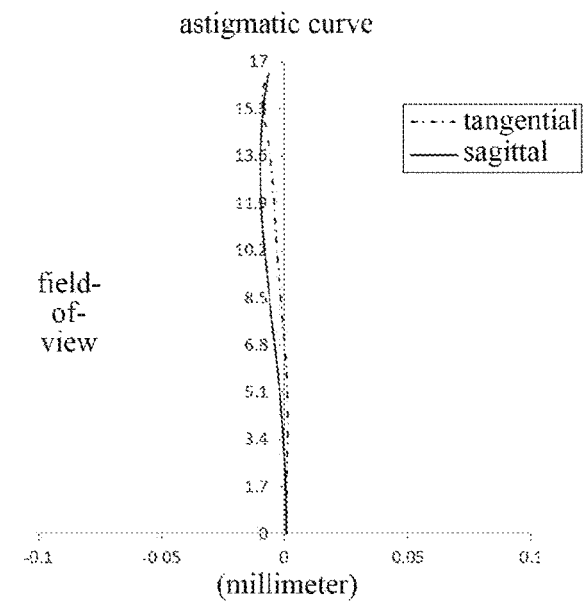
Figure 19:
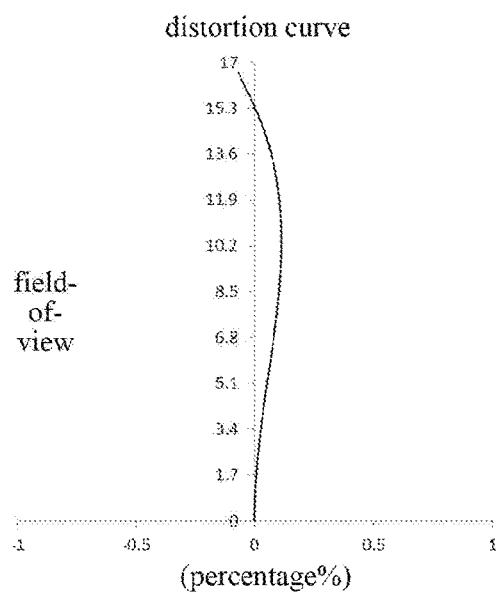
Figure 20:
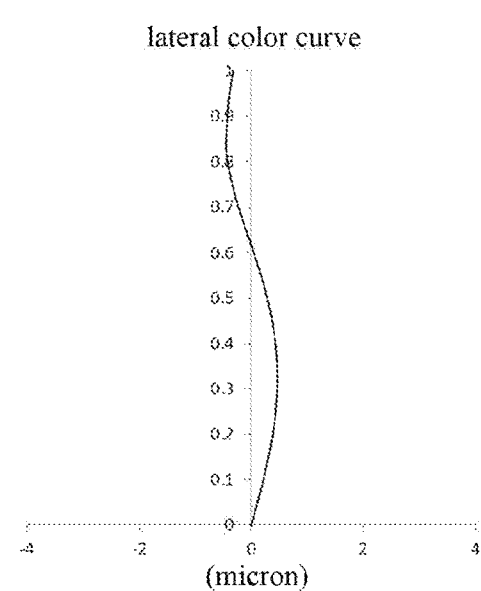

FIG. 17 shows a longitudinal aberration curve of the camera lens assembly according to Embodiment 4, representing deviations of focal points of light of different wavelengths converged after passing through an optical system. FIG. 18 shows an astigmatic curve of the camera lens assembly according to Embodiment 4, representing a curvature of a tangential image plane and a curvature of a sagittal image plane. FIG. 19 shows a distortion curve of the camera lens assembly according to Embodiment 4, representing amounts of distortion at different viewing angles. FIG. 20 shows a lateral color curve of the camera lens assembly according to Embodiment 4, representing deviations of different image heights on an image plane after light passes through the camera lens assembly. In summary, referring to FIG. 17 to FIG. 20, it may be seen that the camera lens assembly according to Embodiment 4 is a miniaturized camera lens assembly having high resolution.

Embodiment 5

A camera lens assembly according to Embodiment 5 of the present disclosure is described below with reference to FIG. 21 to FIG. 25.

FIG. 21 is a schematic structural diagram illustrating the camera lens assembly of Embodiment 5. The camera lens assembly from an object side to an image side sequentially includes a first lens E1, a second lens E2, a third lens E3, a fourth lens E4, a fifth lens E5, and a sixth lens E6.

Table 13 below shows the effective focal lengths f1 to f6 of the first to sixth lenses E1 to E6, the total effective focal length f of the camera lens assembly, the total track length TTL of the camera lens assembly and the half of the maximal field-of-view HFOV of the camera lens assembly.

TABLE 13

| f1(mm) | 8.41 | f(mm) | 10.69 |
|---|---|---|---|
| f2(mm) | −9.43 | TTL(mm) | 11.50 |
| f3(mm) | 6.69 | HFOV(deg) | 16.2 |
| f4(mm) | 14.09 | | |
| f5(mm) | −6.23 | | |
| f6(mm) | −21.12 | | |

Table 14 below shows the surface type, the radius of curvature, the thickness, the material and the conic coefficient of each lens of the camera lens assembly in this Embodiment.

TABLE 14

| surface number | surface type | radius of curvature | thickness | material | conic coefficient |
|---|---|---|---|---|---|
| OBJ | spherical | infinite | infinite | | |
| STO | spherical | infinite | −0.5214 | | |
| S1 | aspheric | 3.5740 | 1.0198 | 1.55, 56.1 | −0.0413 |
| S2 | aspheric | 14.4759 | 0.0500 | | 35.2901 |
| S3 | aspheric | 6.2651 | 0.6000 | 1.65, 23.5 | 1.8557 |
| S4 | aspheric | 2.9727 | 1.2901 | | −0.1107 |
| S5 | aspheric | 19.2874 | 1.2010 | 1.55, 56.1 | 4.2922 |
| S6 | aspheric | −4.4101 | 0.0500 | | 0.5568 |
| S7 | aspheric | 28.6319 | 0.8326 | 1.55, 56.1 | −99.0000 |
| S8 | aspheric | −10.4288 | 0.0500 | | 10.9099 |
| S9 | aspheric | 8.5745 | 0.7517 | 1.55, 56.1 | −4.0446 |
| S10 | aspheric | 2.3623 | 1.1523 | | 0.1739 |
| S11 | aspheric | −5.1566 | 0.6525 | 1.55, 56.1 | 3.6247 |
| S12 | aspheric | −9.7383 | 0.0500 | | 18.8875 |
| S13 | spherical | infinite | 0.3000 | 1.52, 64.2 | |
| S14 | spherical | infinite | 3.5011 | | |
| S15 | spherical | infinite | | | |

Table 15 below shows the higher-order coefficients $A_4$, $A_6$, $A_8$, $A_{10}$ and $A_{12}$ applicable to the aspheric surfaces S1-S12 of the aspheric lenses in this Embodiment.

TABLE 15

| surface number | A4 | A6 | A8 | A10 | A12 |
|---|---|---|---|---|---|
| S1 | −4.8158E−04 | −1.3549E−05 | 1.2042E−05 | −9.5256E−07 | −5.1131E−12 |
| S2 | 7.8338E−04 | 5.4092E−05 | 5.9091E−06 | 5.4898E−06 | −3.1866E−06 |
| S3 | −4.8548E−03 | 2.2476E−04 | 4.5056E−05 | −9.5657E−06 | −1.3797E−06 |
| S4 | −5.1227E−03 | 3.3358E−04 | −1.3731E−05 | 1.9174E−05 | −4.2308E−06 |
| S5 | 6.7731E−04 | −3.4033E−04 | 1.0970E−05 | −6.4674E−06 | −3.8016E−06 |
| S6 | −4.6499E−04 | −3.6956E−04 | −3.2045E−05 | 6.7570E−06 | −2.4866E−06 |
| S7 | −1.0371E−02 | −1.0725E−04 | 8.6903E−06 | 3.1154E−06 | 5.9190E−06 |
| S8 | −7.3587E−03 | −1.8274E−04 | −1.9187E−05 | 9.8504E−06 | 1.9699E−06 |
| S9 | −4.9931E−03 | −7.7138E−04 | −1.3880E−04 | −3.4369E−05 | −1.1977E−06 |
| S10 | −1.1271E−02 | −8.9485E−05 | −1.3346E−04 | −2.9688E−05 | −1.2512E−05 |
| S11 | −4.8006E−03 | 8.1042E−04 | 2.7861E−04 | 3.2087E−05 | 3.2592E−07 |
| S12 | −6.5483E−03 | 2.1504E−04 | 2.9266E−05 | 2.1415E−06 | −2.0362E−06 |

Figures 24, 25:
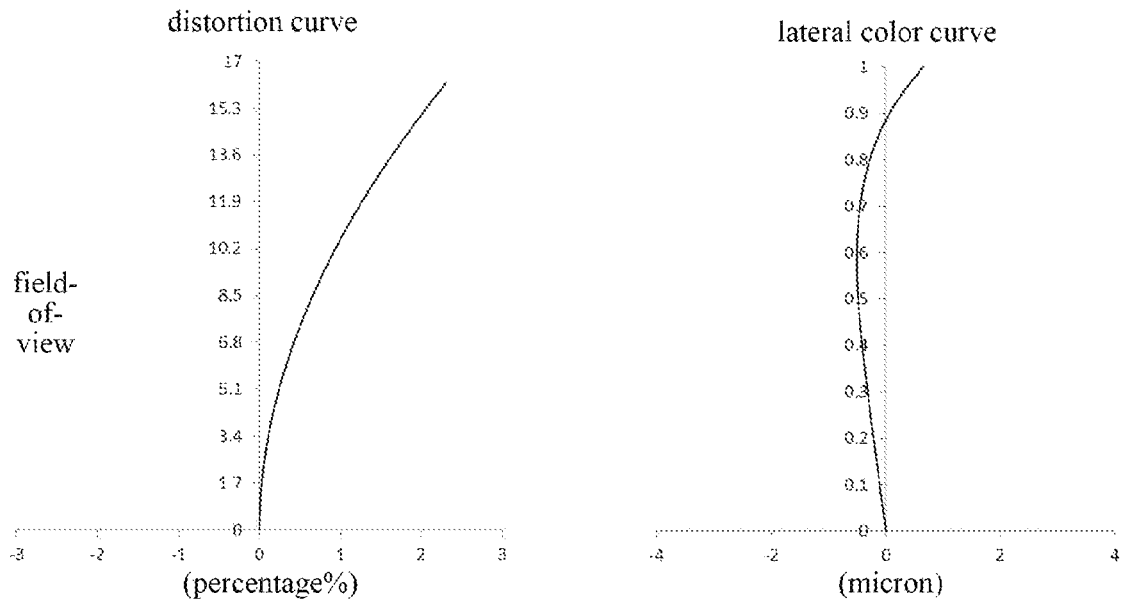

FIG. 22 shows a longitudinal aberration curve of the camera lens assembly according to Embodiment 5, representing deviations of focal points of light of different wavelengths converged after passing through an optical system. FIG. 23 shows an astigmatic curve of the camera lens assembly according to Embodiment 5, representing a curvature of a tangential image plane and a curvature of a sagittal image plane. FIG. 24 shows a distortion curve of the camera lens assembly according to Embodiment 5, representing amounts of distortion at different viewing angles. FIG. 25 shows a lateral color curve of the camera lens assembly according to Embodiment 5, representing deviations of different image heights on an image plane after light passes through the camera lens assembly. In summary, referring to FIG. 22 to FIG. 25, it may be seen that the camera lens assembly according to Embodiment 5 is a miniaturized camera lens assembly having high resolution.

Embodiment 6

A camera lens assembly according to Embodiment 6 of the present disclosure is described below with reference to FIG. 26 to FIG. 30.

Figure 26:
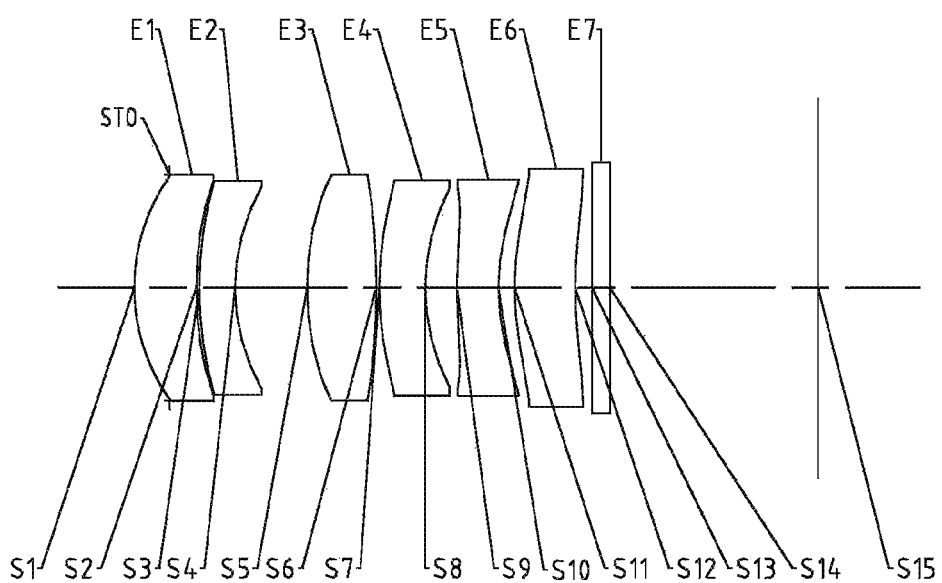
FIG. 26 is a schematic structural diagram illustrating a camera lens assembly according to Embodiment 6.

FIG. 26 is a schematic structural diagram illustrating the camera lens assembly of Embodiment 6. The camera lens assembly from an object side to an image side sequentially includes a first lens E1, a second lens E2, a third lens E3, a fourth lens E4, a fifth lens E5, and a sixth lens E6.

Table 16 below shows the effective focal lengths f1 to f6 of the first to sixth lenses E1 to E6, the total effective focal length f of the camera lens assembly, the total track length TTL of the camera lens assembly and the half of the maximal field-of-view HFOV of the camera lens assembly.

TABLE 16

| | |
|---|---:|
| f1(mm) | 10.26 |
| f2(mm) | −11.34 |
| f3(mm) | 7.14 |
| f4(mm) | −16.93 |
| f5(mm) | −12.07 |
| f6(mm) | 22.74 |
| f(mm) | 10.70 |
| TTL(mm) | 11.50 |
| HFOV(deg) | 16.2 |

Table 17 below shows the surface type, the radius of curvature, the thickness, the material and the conic coefficient of each lens of the camera lens assembly in this Embodiment.

TABLE 17

| surface number | surface type | radius of curvature | thickness | material | conic coefficient |
|---|---|---:|---:|---|---:|
| OBJ | spherical | infinite | infinite | | |
| STO | spherical | infinite | −0.5922 | | |
| S1 | aspheric | 3.2647 | 1.0434 | 1.55, 56.1 | 0.0363 |
| S2 | aspheric | 6.9368 | 0.0500 | | 6.6501 |
| S3 | aspheric | 6.5794 | 0.6000 | 1.65, 23.5 | 0.0491 |
| S4 | aspheric | 3.3427 | 1.2128 | | −0.1458 |
| S5 | aspheric | 5.1770 | 1.1636 | 1.55, 56.1 | 0.9879 |
| S6 | aspheric | −14.5471 | 0.0500 | | 14.5739 |
| S7 | aspheric | 5.5655 | 0.7743 | 1.65, 23.5 | 3.7601 |
| S8 | aspheric | 3.4873 | 0.5310 | | −0.2926 |
| S9 | aspheric | 8.3642 | 0.6981 | 1.55, 56.1 | −15.3971 |
| S10 | aspheric | 3.5791 | 0.2745 | | −0.4792 |
| S11 | aspheric | 4.8102 | 1.0159 | 1.65, 23.5 | −11.0991 |
| S12 | aspheric | 6.5584 | 0.2864 | | −17.2922 |
| S13 | spherical | infinite | 0.3000 | 1.52, 64.2 | |
| S14 | spherical | infinite | 3.5007 | | |
| S15 | spherical | infinite | | | |

Table 18 below shows the higher-order coefficients $A_4$, $A_6$, $A_8$, $A_{10}$ and $A_{12}$ applicable to the aspheric surfaces S1-S12 of the aspheric lenses in this Embodiment.

TABLE 18

| surface number | A4 | A6 | A8 | A10 | A12 |
|---|---:|---:|---:|---:|---:|
| S1 | −2.1080E−04 | 1.6251E−05 | 1.0027E−05 | −2.6236E−07 | −9.4393E−07 |
| S2 | 2.0796E−03 | −3.5601E−07 | −2.6608E−05 | −1.1193E−06 | −1.7680E−06 |
| S3 | −2.1710E−04 | −4.1543E−05 | 1.2291E−05 | −1.7746E−06 | 1.1402E−06 |
| S4 | −1.8147E−03 | 6.5044E−05 | −2.4073E−05 | 2.3152E−05 | −2.1818E−06 |
| S5 | 1.5769E−03 | 2.2901E−04 | 3.0239E−05 | 1.5625E−06 | −4.7653E−07 |
| S6 | −1.3005E−03 | −5.4846E−05 | 2.5759E−05 | −2.2496E−06 | −3.6964E−07 |
| S7 | −6.1307E−03 | −2.3023E−05 | −7.3682E−05 | −1.8054E−06 | −4.9534E−06 |
| S8 | −5.1593E−03 | 1.1811E−03 | 1.2126E−04 | 3.3325E−05 | −1.7481E−05 |
| S9 | −1.1473E−02 | −2.7178E−03 | 3.6028E−04 | 3.4268E−05 | −1.9892E−05 |
| S10 | −1.1875E−02 | 4.0043E−04 | −7.1435E−05 | 4.0804E−06 | −7.9138E−06 |
| S11 | −4.9368E−03 | 4.3990E−04 | 1.3666E−04 | −4.8267E−06 | −8.2277E−06 |
| S12 | −7.4388E−03 | 6.4471E−05 | 9.2711E−05 | −2.9622E−06 | −1.2653E−06 |

Figure 27:
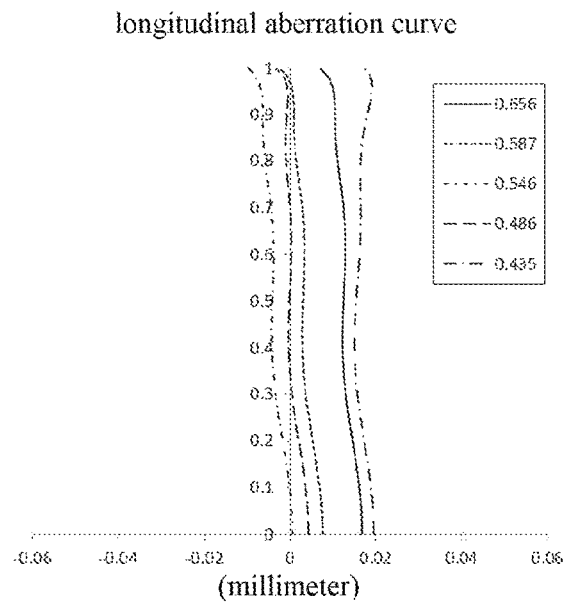
FIGS. 27-30 respectively illustrate a longitudinal aberration curve, an astigmatic curve, a distortion curve and a lateral color curve of the camera lens assembly according to Embodiment 6.
Figure 28:
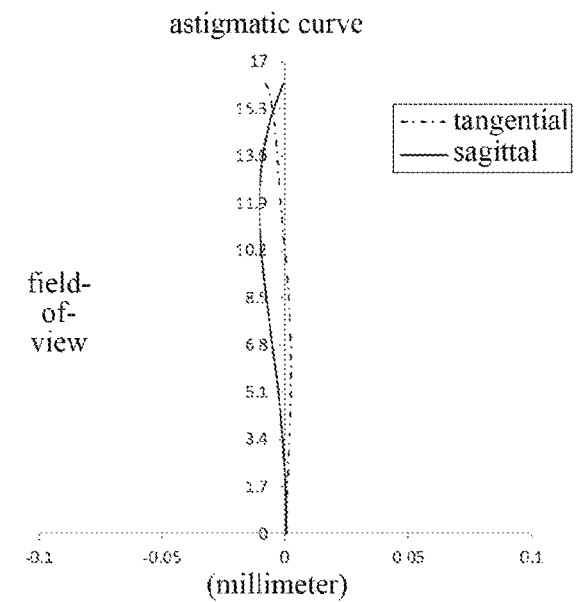
Figure 29:
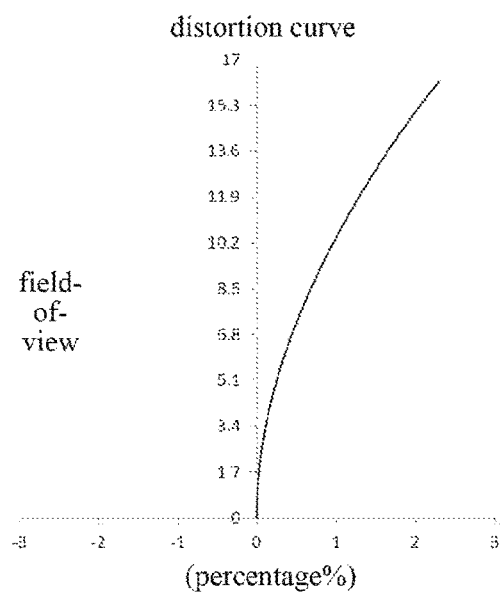
Figure 30:
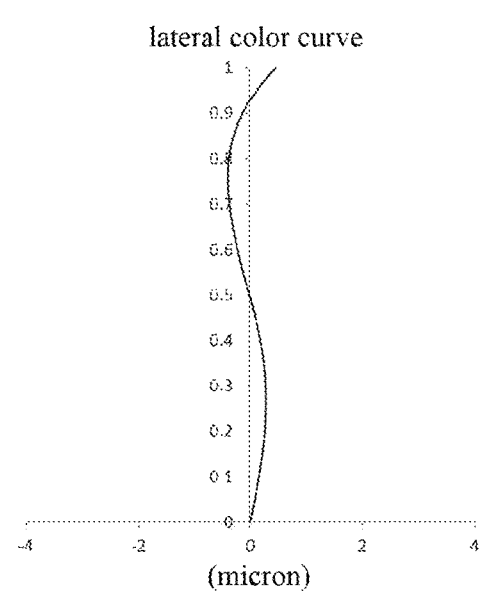

FIG. 27 shows a longitudinal aberration curve of the camera lens assembly according to Embodiment 6, representing deviations of focal points of light of different wavelengths converged after passing through an optical system. FIG. 28 shows an astigmatic curve of the camera lens assembly according to Embodiment 6, representing a curvature of a tangential image plane and a curvature of a sagittal image plane. FIG. 29 shows a distortion curve of the camera lens assembly according to Embodiment 6, representing amounts of distortion at different viewing angles. FIG. 30 shows a lateral color curve of the camera lens assembly according to Embodiment 6, representing deviations of different image heights on an image plane after light passes through the camera lens assembly. In summary, referring to FIG. 27 to FIG. 30, it may be seen that the camera lens assembly according to Embodiment 6 is a miniaturized camera lens assembly having high resolution.

Embodiment 7

A camera lens assembly according to Embodiment 7 of the present disclosure is described below with reference to FIG. 31 to FIG. 35.

FIG. 31 is a schematic structural diagram illustrating the camera lens assembly of Embodiment 7. The camera lens assembly from an object side to an image side sequentially includes a first lens E1, a second lens E2, a third lens E3, a fourth lens E4, a fifth lens E5, and a sixth lens E6.

Table 19 below shows the effective focal lengths f1 to f6 of the first to sixth lenses E1 to E6, the total effective focal length f of the camera lens assembly, the total track length TTL of the camera lens assembly and the half of the maximal field-of-view HFOV of the camera lens assembly.

TABLE 19

| | |
|---|---:|
| f1(mm) | 9.19 |
| f2(mm) | −8.94 |
| f3(mm) | 7.24 |
| f4(mm) | −28.55 |
| f5(mm) | 108.03 |
| f6(mm) | −13.56 |
| f(mm) | 10.70 |
| TTL(mm) | 11.33 |
| HFOV(deg) | 16.2 |

Table 20 below shows the surface type, the radius of curvature, the thickness, the material and the conic coefficient of each lens of the camera lens assembly in this Embodiment.

TABLE 20

| surface number | surface type | radius of curvature | thickness | material | conic coefficient |
|---|---|---:|---:|---|---|
| OBJ | spherical | infinite | infinite | | |
| STO | spherical | infinite | −0.5171 | | |

TABLE 20-continued

| surface number | surface type | radius of curvature | thickness | material | conic coefficient |
|---|---|---|---|---|---|
| S1 | aspheric | 3.5866 | 0.9763 | 1.55, 56.1 | −0.0334 |
| S2 | aspheric | 11.3429 | 0.2231 | | 16.6955 |
| S3 | aspheric | 12.9295 | 0.6000 | 1.65, 23.5 | 2.2292 |
| S4 | aspheric | 3.9192 | 0.7488 | | −0.2339 |
| S5 | aspheric | 9.1846 | 1.1624 | 1.55, 56.1 | −1.1086 |
| S6 | aspheric | −6.6418 | 0.0500 | | 2.5386 |
| S7 | aspheric | 4.6472 | 0.7398 | 1.55, 56.1 | 0.0914 |
| S8 | aspheric | 3.3792 | 0.3984 | | 0.1041 |
| S9 | aspheric | 4.0704 | 0.7671 | 1.65, 23.5 | −0.3102 |
| S10 | aspheric | 4.0027 | 0.8961 | | 0.1702 |
| S11 | aspheric | −4.9725 | 0.9118 | 1.55, 56.1 | 4.9191 |
| S12 | aspheric | −16.0837 | 0.0500 | | 43.8964 |
| S13 | spherical | infinite | 0.3000 | 1.52, 64.2 | |
| S14 | spherical | infinite | 3.5012 | | |
| S15 | spherical | infinite | | | |

Table 21 below shows the higher-order coefficients $A_4$, $A_6$, $A_8$, $A_{10}$ and $A_{12}$ applicable to the aspheric surfaces S1-S12 of the aspheric lenses in this Embodiment.

TABLE 21

| surface number | A4 | A6 | A8 | A10 | A12 |
|---|---|---|---|---|---|
| S1 | −5.9492E−04 | 6.7458E−06 | 5.8498E−06 | −1.7088E−07 | −4.5796E−07 |
| S2 | 2.2938E−03 | 1.3829E−04 | 2.8106E−06 | 1.5856E−06 | −6.6836E−08 |
| S3 | −5.8593E−04 | 1.0988E−05 | 2.3099E−05 | 1.0837E−06 | −1.7195E−07 |
| S4 | −2.1052E−03 | 1.3921E−04 | 1.3392E−05 | 2.1123E−05 | −2.1848E−06 |
| S5 | 1.4615E−03 | −1.1684E−04 | −5.0048E−06 | −7.8172E−06 | 1.1127E−06 |
| S6 | −3.6542E−03 | −2.4282E−04 | −3.3365E−05 | 3.7474E−06 | −5.9338E−07 |
| S7 | −7.9903E−03 | −2.4922E−04 | 4.2242E−06 | 1.6212E−06 | 4.6813E−07 |
| S8 | −1.2422E−02 | 4.6253E−05 | 4.4915E−05 | 8.6199E−06 | −1.7893E−05 |
| S9 | −6.1503E−03 | −1.2062E−04 | 1.6748E−04 | −6.0149E−06 | −1.5696E−05 |
| S10 | −3.8418E−03 | −4.0683E−04 | −4.3505E−05 | 3.8469E−05 | −2.3870E−05 |
| S11 | −2.0126E−02 | −2.9064E−04 | −7.5024E−05 | −8.5240E−06 | −5.6308E−06 |
| S12 | −1.3680E−02 | 8.7605E−04 | −1.6089E−05 | −1.6101E−05 | 3.9285E−06 |

Figures 34, 35:
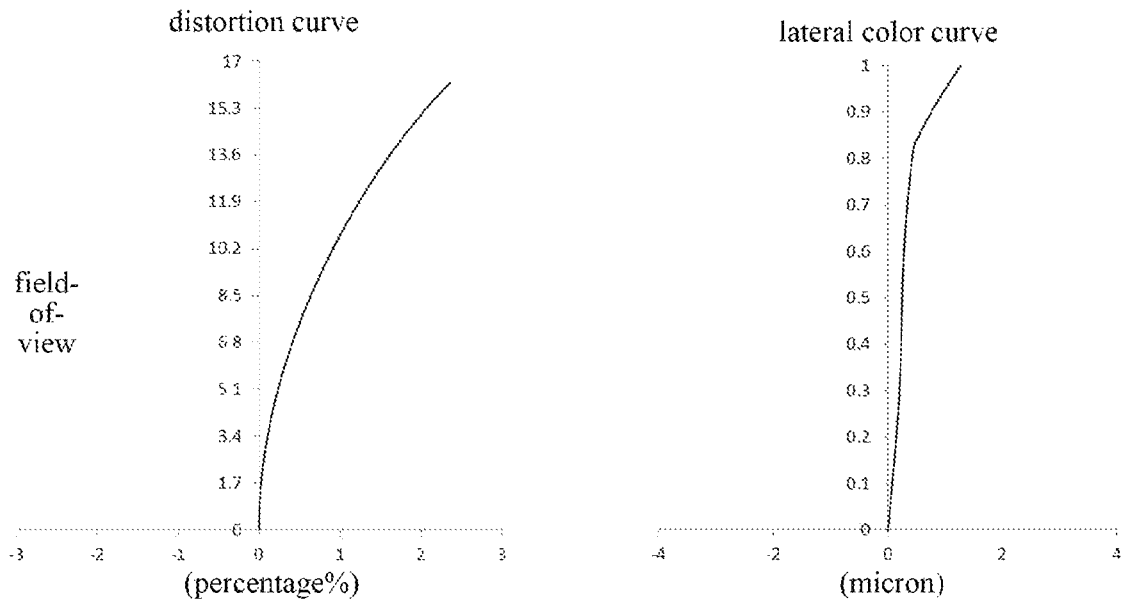

FIG. 32 shows a longitudinal aberration curve of the camera lens assembly according to Embodiment 7, representing deviations of focal points of light of different wavelengths converged after passing through an optical system. FIG. 33 shows an astigmatic curve of the camera lens assembly according to Embodiment 7, representing a curvature of a tangential image plane and a curvature of a sagittal image plane. FIG. 34 shows a distortion curve of the camera lens assembly according to Embodiment 7, representing amounts of distortion at different viewing angles. FIG. 35 shows a lateral color curve of the camera lens assembly according to Embodiment 7, representing deviations of different image heights on an image plane after light passes through the camera lens assembly. In summary, referring to FIG. 32 to FIG. 35, it may be seen that the camera lens assembly according to Embodiment 7 is a miniaturized camera lens assembly having high resolution.

Embodiment 8

A camera lens assembly according to Embodiment 8 of the present disclosure is described below with reference to FIG. 36 to FIG. 40.

Figure 36:
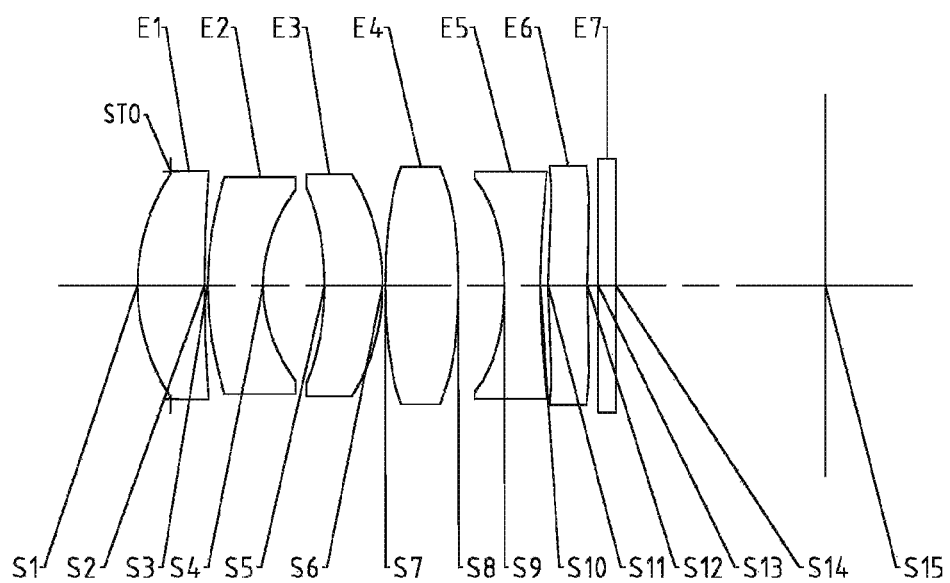
FIG. 36 is a schematic structural diagram illustrating a camera lens assembly according to Embodiment 8.

FIG. 36 is a schematic structural diagram illustrating the camera lens assembly of Embodiment 8. The camera lens assembly from an object side to an image side sequentially includes a first lens E1, a second lens E2, a third lens E3, a fourth lens E4, a fifth lens E5, and a sixth lens E6.

Table 22 below shows the effective focal lengths f1 to f6 of the first to sixth lenses E1 to E6, the total effective focal length f of the camera lens assembly, the total track length TTL of the camera lens assembly and the half of the maximal field-of-view HFOV of the camera lens assembly.

TABLE 22

| f1(mm) | 6.82 |
|---|---|
| f2(mm) | −8.11 |
| f3(mm) | 18.31 |
| f4 (mm) | 10.14 |
| f5(mm) | −6.27 |
| f6(mm) | 50.60 |
| f(mm) | 10.70 |
| TTL(mm) | 11.50 |
| HFOV(deg) | 16.3 |

Table 23 below shows the surface type, the radius of curvature, the thickness, the material and the conic coefficient of each lens of the camera lens assembly in this Embodiment.

TABLE 23

| surface number | surface type | radius of curvature | thickness | material | conic coefficient |
|---|---|---|---|---|---|
| OBJ | spherical | infinite | infinite | | |
| STO | spherical | infinite | −0.5552 | | |
| S1 | aspheric | 3.4273 | 1.1222 | 1.55, 56.1 | 0.0164 |
| S2 | aspheric | 37.9811 | 0.0500 | | 48.3236 |
| S3 | aspheric | 5.3841 | 0.9273 | 1.66, 21.5 | 0.1066 |
| S4 | aspheric | 2.4966 | 1.0290 | | −0.0268 |
| S5 | aspheric | −5.4053 | 0.9681 | 1.55, 56.1 | −0.4828 |
| S6 | aspheric | −3.7313 | 0.0500 | | 0.1283 |
| S7 | aspheric | 10.9144 | 1.2205 | 1.55, 56.1 | −9.3004 |
| S8 | aspheric | −10.8151 | 0.7671 | | 1.5110 |
| S9 | aspheric | −4.7449 | 0.6000 | 1.55, 56.1 | 1.8278 |
| S10 | aspheric | 12.9153 | 0.1318 | | −5.5303 |
| S11 | aspheric | 10.4363 | 0.6571 | 1.65, 23.5 | −8.0190 |
| S12 | aspheric | 14.9510 | 0.1769 | | 33.5339 |
| S13 | spherical | infinite | 0.3000 | 1.52, 64.2 | |
| S14 | spherical | infinite | 3.5009 | | |
| S15 | spherical | infinite | | | |

Table 24 below shows the higher-order coefficients $A_4$, $A_6$, $A_8$, $A_{10}$ and $A_{12}$ applicable to the aspheric surfaces S1-S12 of the aspheric lenses in this Embodiment.

TABLE 24

| surface number | A4 | A6 | A8 | A10 | A12 |
|---|---|---|---|---|---|
| S1 | −6.9692E−05 | −4.8948E−05 | 6.0658E−06 | −2.1870E−07 | −6.9976E−07 |
| S2 | 1.6663E−03 | −6.8788E−05 | −5.7498E−06 | 2.2935E−06 | −1.4142E−06 |
| S3 | −3.9168E−03 | 1.7674E−04 | 2.4038E−05 | −4.7749E−06 | −2.3266E−07 |
| S4 | −5.9286E−03 | 4.9735E−04 | 3.5768E−06 | 9.4031E−06 | −2.9729E−07 |
| S5 | −6.2822E−03 | −4.0004E−04 | −4.9245E−05 | −2.7024E−05 | 2.7832E−06 |
| S6 | −4.2995E−04 | −1.2511E−04 | −3.6284E−05 | 7.2278E−06 | 1.0517E−06 |
| S7 | 3.9193E−03 | 2.0286E−04 | 4.7330E−05 | 4.9027E−06 | 3.8005E−08 |
| S8 | −8.1023E−03 | 7.5124E−07 | −4.7537E−05 | −1.1911E−06 | 3.2012E−06 |
| S9 | −8.4030E−03 | −9.0497E−04 | −1.1261E−04 | −8.6054E−06 | 1.5446E−05 |
| S10 | −6.0685E−04 | −3.3373E−04 | −5.2603E−05 | −8.8154E−07 | 1.5549E−06 |
| S11 | −1.0683E−02 | 3.7379E−04 | 2.9968E−05 | −8.8379E−06 | −4.9716E−06 |
| S12 | −1.2396E−02 | 2.5782E−04 | 4.7156E−05 | −6.0528E−06 | −1.9358E−06 |

Figure 37:
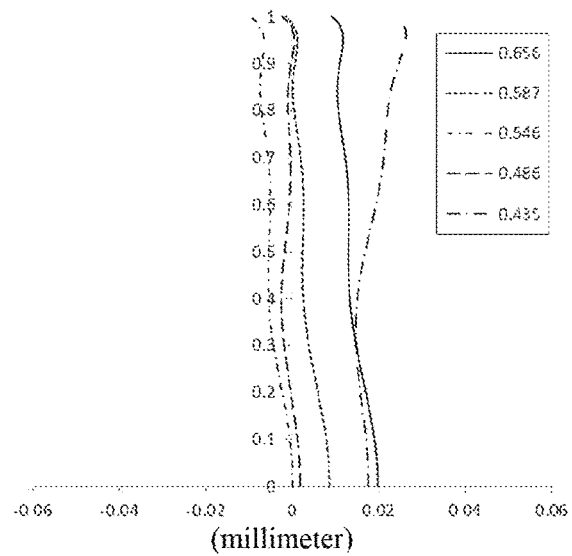
FIGS. 37-40 respectively illustrate a longitudinal aberration curve, an astigmatic curve, a distortion curve and a lateral color curve of the camera lens assembly according to Embodiment 8.
Figure 38:
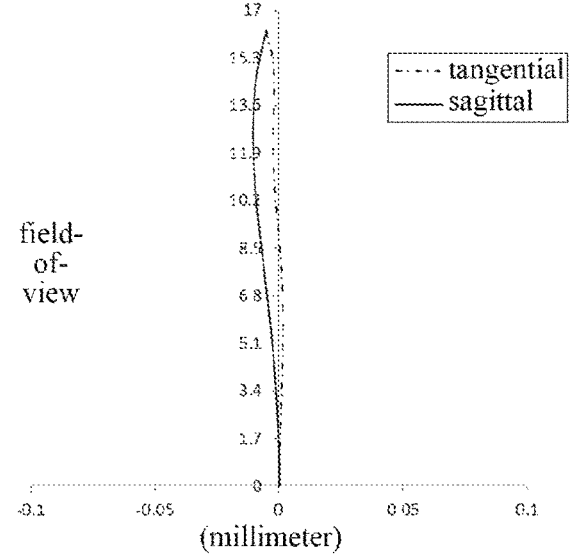
Figure 39:
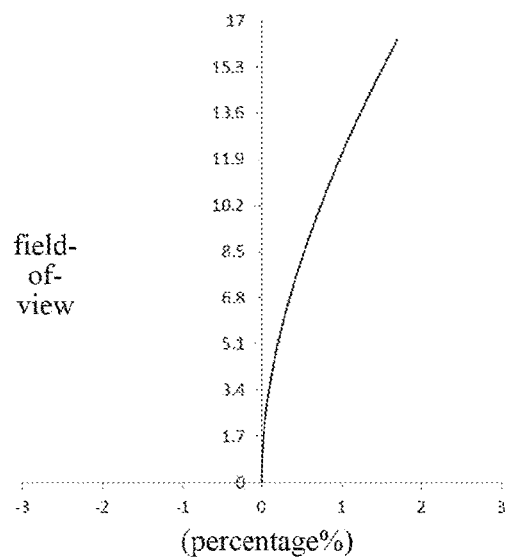
Figure 40:
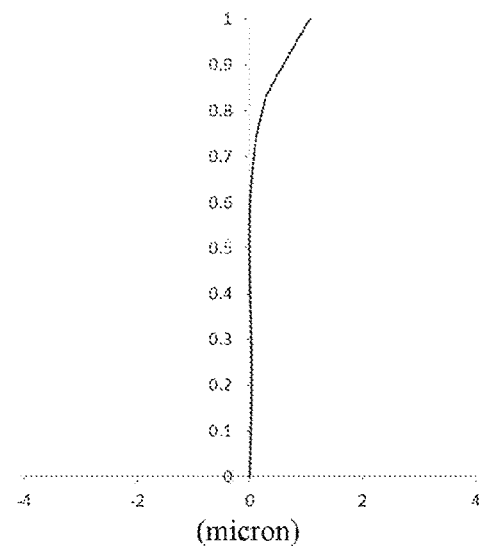

FIG. 37 shows a longitudinal aberration curve of the camera lens assembly according to Embodiment 8, representing deviations of focal points of light of different wavelengths converged after passing through an optical system. FIG. 38 shows an astigmatic curve of the camera lens assembly according to Embodiment 8, representing a curvature of a tangential image plane and a curvature of a sagittal image plane. FIG. 39 shows a distortion curve of the camera lens assembly according to Embodiment 8, representing amounts of distortion at different viewing angles. FIG. 40 shows a lateral color curve of the camera lens assembly according to Embodiment 8, representing deviations of different image heights on an image plane after light passes through the camera lens assembly. In summary, referring to FIG. 37 to FIG. 40, it may be seen that the camera lens assembly according to Embodiment 8 is a miniaturized camera lens assembly having high resolution.

Embodiment 9

A camera lens assembly according to Embodiment 9 of the present disclosure is described below with reference to FIG. 41 to FIG. 45.

FIG. 41 is a schematic structural diagram illustrating the camera lens assembly of Embodiment 9. The camera lens assembly from an object side to an image side sequentially includes a first lens E1, a second lens E2, a third lens E3, a fourth lens E4, a fifth lens E5, and a sixth lens E6.

Table 25 below shows the effective focal lengths f1 to f6 of the first to sixth lenses E1 to E6, the total effective focal length f of the camera lens assembly, the total track length TTL of the camera lens assembly and the half of the maximal field-of-view HFOV of the camera lens assembly.

TABLE 25

| | |
|---|---|
| f1(mm) | 8.29 |
| f2(mm) | −8.94 |

TABLE 25-continued

| | |
|---|---|
| f3(mm) | 6.61 |
| f4(mm) | −29.79 |
| f5(mm) | −10.30 |
| f6(mm) | 264.61 |
| f(mm) | 10.70 |
| TTL(mm) | 11.50 |
| HFOV(deg) | 16.2 |

Table 26 below shows the surface type, the radius of curvature, the thickness, the material and the conic coefficient of each lens of the camera lens assembly in this Embodiment.

TABLE 26

| surface number | surface type | radius of curvature | thickness | material | conic coefficient |
|---|---|---|---|---|---|
| OBJ | spherical | infinite | infinite | | |
| STO | spherical | infinite | −0.5330 | | |
| S1 | aspheric | 3.5693 | 1.0272 | 1.55, 56.1 | 0.0754 |
| S2 | aspheric | 15.1316 | 0.0500 | | 41.6783 |
| S3 | aspheric | 9.5210 | 0.9429 | 1.65, 23.5 | 2.2186 |
| S4 | aspheric | 3.4553 | 1.0920 | | −0.2736 |
| S5 | aspheric | 12.7278 | 1.3914 | 1.55, 56.1 | −3.0970 |
| S6 | aspheric | −4.8481 | 0.0500 | | 0.7879 |
| S7 | aspheric | 4.0835 | 0.6777 | 1.55, 56.1 | −5.3437 |
| S8 | aspheric | 3.0731 | 0.8631 | | −2.9109 |
| S9 | aspheric | −7.6977 | 0.6000 | 1.55, 56.1 | 4.1070 |
| S10 | aspheric | 21.5180 | 0.0517 | | −36.8777 |
| S11 | aspheric | 6.6925 | 0.7027 | 1.65, 23.5 | −0.6145 |
| S12 | aspheric | 6.6781 | 0.2514 | | −18.9811 |
| S13 | spherical | infinite | 0.3000 | 1.52, 64.2 | |
| S14 | spherical | infinite | 3.5000 | | |
| S15 | spherical | infinite | | | |

Table 27 below shows the higher-order coefficients $A_4$, $A_6$, $A_8$, $A_{10}$ and $A_{12}$ applicable to the aspheric surfaces S1-S12 of the aspheric lenses in this Embodiment.

TABLE 27

| surface number | A4 | A6 | A8 | A10 | A12 |
|---|---|---|---|---|---|
| S1 | −2.4515E−04 | −2.1235E−05 | 1.9624E−05 | −4.7552E−06 | 6.7490E−07 |
| S2 | 2.5819E−03 | −2.8337E−04 | −1.1320E−05 | 9.6403E−06 | −2.4930E−06 |
| S3 | −1.6632E−03 | 2.9361E−05 | 1.1088E−05 | −5.4880E−06 | 1.6132E−07 |
| S4 | −3.8264E−03 | 6.6417E−04 | −6.1587E−05 | 1.2097E−05 | 3.9683E−07 |
| S5 | 1.6065E−03 | −5.7483E−04 | 5.5309E−05 | −9.0525E−06 | 4.5331E−07 |
| S6 | −1.8287E−03 | −3.1372E−04 | −1.6372E−05 | 6.0605E−06 | −1.2223E−06 |
| S7 | −9.7100E−03 | −4.5367E−04 | 4.0243E−05 | −6.1136E−06 | 2.3906E−07 |
| S8 | −2.0134E−02 | −1.4562E−04 | −2.3510E−05 | −1.0511E−05 | 1.1207E−06 |

TABLE 27-continued

| surface number | A4 | A6 | A8 | A10 | A12 |
|---|---|---|---|---|---|
| S9 | −1.7352E−02 | −1.1889E−03 | 6.9995E−05 | −1.8703E−05 | 4.5371E−06 |
| S10 | 4.7443E−04 | −2.1840E−04 | 6.4657E−05 | 3.4869E−06 | −7.9293E−07 |
| S11 | −1.3210E−02 | 7.6392E−04 | −1.0011E−04 | −4.6737E−06 | 7.4589E−07 |
| S12 | −1.0128E−02 | 4.5541E−04 | 4.4566E−05 | −1.8566E−05 | 1.3693E−06 |

Figure 44:
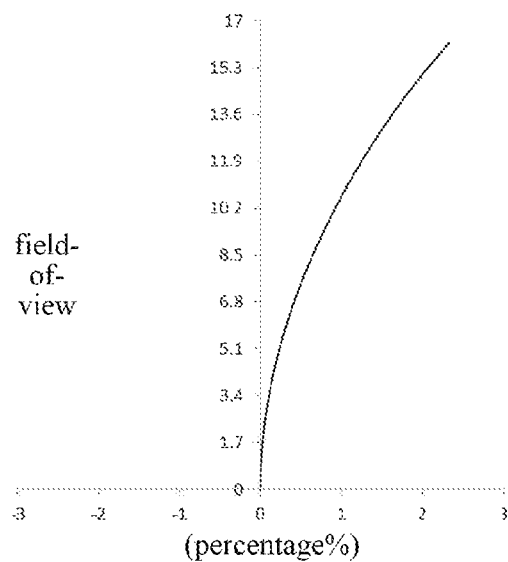
Figure 45:
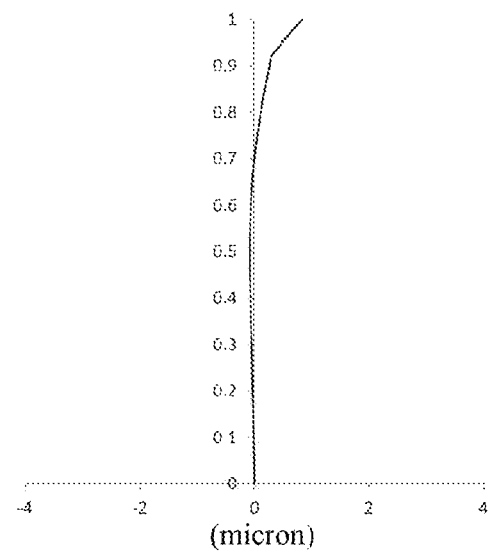

FIG. 42 shows a longitudinal aberration curve of the camera lens assembly according to Embodiment 9, representing deviations of focal points of light of different wavelengths converged after passing through an optical system. FIG. 43 shows an astigmatic curve of the camera lens assembly according to Embodiment 9, representing a curvature of a tangential image plane and a curvature of a sagittal image plane. FIG. 44 shows a distortion curve of the camera lens assembly according to Embodiment 9, representing amounts of distortion at different viewing angles. FIG. 45 shows a lateral color curve of the camera lens assembly according to Embodiment 9, representing deviations of different image heights on an image plane after light passes through the camera lens assembly. In summary, referring to FIG. 42 to FIG. 45, it may be seen that the camera lens assembly according to Embodiment 9 is a miniaturized camera lens assembly having high resolution.

Embodiment 10

A camera lens assembly according to Embodiment 10 of the present disclosure is described below with reference to FIG. 46 to FIG. 50.

Figure 46:
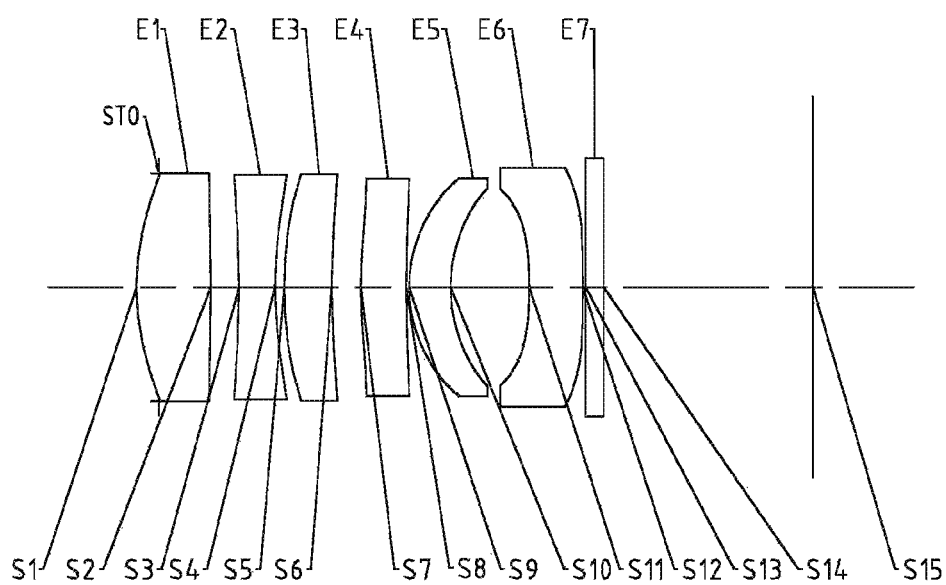
FIG. 46 is a schematic structural diagram illustrating a camera lens assembly according to Embodiment 10.

FIG. 46 is a schematic structural diagram illustrating the camera lens assembly of Embodiment 10. The camera lens assembly from an object side to an image side sequentially includes a first lens E1, a second lens E2, a third lens E3, a fourth lens E4, a fifth lens E5, and a sixth lens E6.

Table 28 below shows the effective focal lengths f1 to f6 of the first to sixth lenses E1 to E6, the total effective focal length f of the camera lens assembly, the total track length TTL of the camera lens assembly and the half of the maximal field-of-view HFOV of the camera lens assembly.

TABLE 28

| f1(mm) | 7.30 |
|---|---|
| f2(mm) | −7.27 |

TABLE 28-continued

| f3(mm) | 34.89 |
|---|---|
| f4(mm) | 18.34 |
| f5(mm) | 30.56 |
| f6(mm) | −14.56 |
| f(mm) | 10.71 |
| TTL(mm) | 11.31 |
| HFOV(deg) | 16.3 |

Table 29 below shows the surface type, the radius of curvature, the thickness, the material and the conic coefficient of each lens of the camera lens assembly in this Embodiment.

TABLE 29

| surface number | surface type | radius of curvature | thickness | material | conic coefficient |
|---|---|---|---|---|---|
| OBJ | spherical | infinite | infinite | | |
| STO | spherical | infinite | −0.3766 | | |
| S1 | aspheric | 4.3654 | 1.2432 | 1.55, 56.1 | 1.0344 |
| S2 | aspheric | −41.8825 | 0.4726 | | 21.7127 |
| S3 | aspheric | −15.7464 | 0.6000 | 1.65, 23.5 | 48.5091 |
| S4 | aspheric | 6.7889 | 0.1568 | | 1.3629 |
| S5 | aspheric | 7.9428 | 0.7929 | 1.55, 56.1 | 3.2639 |
| S6 | aspheric | 13.1324 | 0.4899 | | −99.0000 |
| S7 | aspheric | 8.3825 | 0.7548 | 1.65, 23.5 | −29.0265 |
| S8 | aspheric | 27.6539 | 0.0500 | | −56.4355 |
| S9 | aspheric | 2.3571 | 0.6928 | 1.55, 56.1 | 0.0536 |
| S10 | aspheric | 2.4593 | 1.3163 | | −0.1993 |
| S11 | aspheric | −7.6346 | 0.8949 | 1.55, 56.1 | 13.5719 |
| S12 | aspheric | −197.0684 | 0.0488 | | 50.0000 |
| S13 | spherical | infinite | 0.3000 | 1.52, 64.2 | |
| S14 | spherical | infinite | 3.5007 | | |
| S15 | spherical | infinite | | | |

Table 30 below shows the higher-order coefficients $A_4$, $A_6$, $A_8$, $A_{10}$ and $A_{12}$ applicable to the aspheric surfaces S1-S12 of the aspheric lenses in this Embodiment.

TABLE 30

| surface number | A4 | A6 | A8 | A10 | A12 |
|---|---|---|---|---|---|
| S1 | −3.2489E−03 | −3.1506E−04 | −3.5033E−05 | −5.1227E−06 | −7.1857E−07 |
| S2 | 4.8417E−03 | −5.5136E−04 | −1.0880E−04 | −5.2187E−06 | 1.0941E−06 |
| S3 | 7.2427E−03 | −6.0405E−04 | −4.5290E−05 | −3.9770E−06 | 3.7766E−06 |
| S4 | −5.5153E−03 | 2.3054E−04 | −7.7799E−05 | −1.5705E−06 | −3.3987E−06 |
| S5 | 3.5605E−03 | 8.2329E−05 | 6.0374E−05 | −1.4123E−05 | −4.7090E−06 |
| S6 | −4.6103E−04 | −6.5590E−06 | −4.2505E−05 | 5.6013E−06 | 9.4922E−07 |
| S7 | −5.4261E−03 | −2.1871E−04 | −3.8651E−06 | −4.7853E−06 | 5.1337E−07 |
| S8 | 1.2658E−03 | −2.0254E−04 | −3.4499E−06 | 5.4190E−07 | −8.5233E−06 |
| S9 | −6.6890E−03 | 9.3135E−04 | 2.4784E−05 | −2.3035E−05 | 4.7532E−06 |
| S10 | −1.0983E−02 | 3.3835E−03 | −1.4562E−04 | 8.7113E−05 | 1.0319E−05 |
| S11 | −3.1426E−02 | −3.0441E−04 | −9.6962E−05 | −7.8470E−05 | −1.2698E−05 |
| S12 | −2.2468E−02 | 1.5067E−03 | −6.9668E−05 | −1.8099E−05 | 2.8948E−06 |

Figure 47:
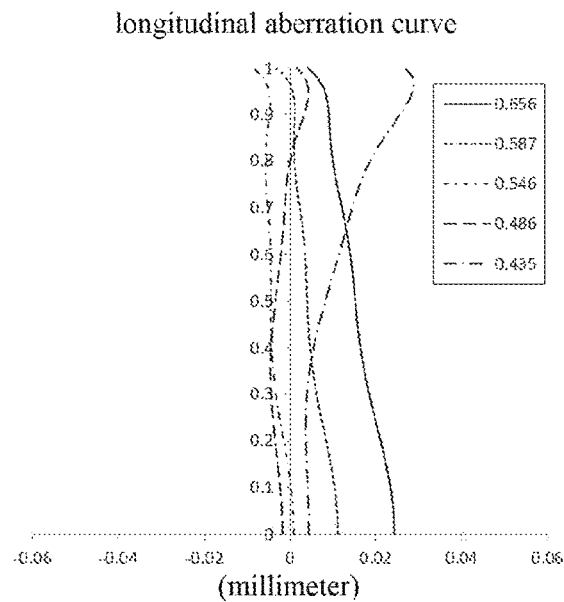
FIGS. 47-50 respectively illustrate a longitudinal aberration curve, an astigmatic curve, a distortion curve and a lateral color curve of the camera lens assembly according to Embodiment 10.
Figure 48:
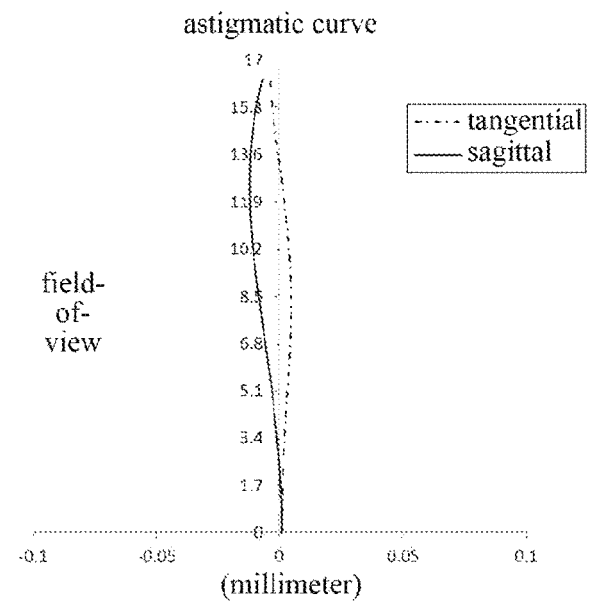
Figure 49:
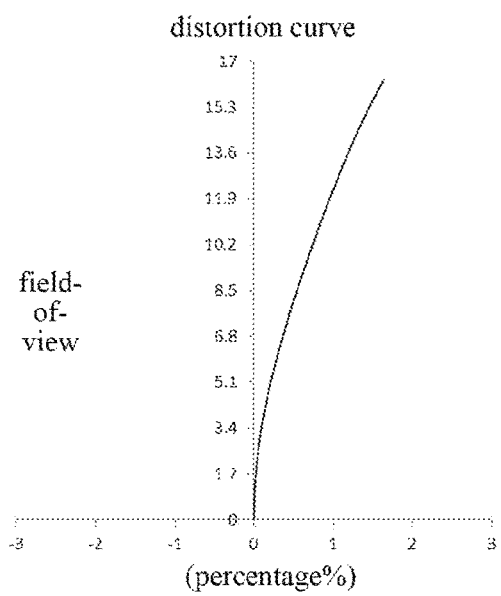
Figure 50:
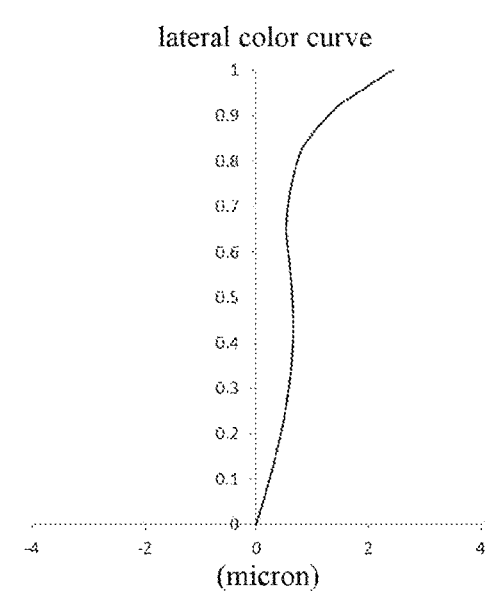

FIG. 47 shows a longitudinal aberration curve of the camera lens assembly according to Embodiment 10, representing deviations of focal points of light of different wavelengths converged after passing through an optical system. FIG. 48 shows an astigmatic curve of the camera lens assembly according to Embodiment 10, representing a curvature of a tangential image plane and a curvature of a sagittal image plane. FIG. 49 shows a distortion curve of the camera lens assembly according to Embodiment 10, representing amounts of distortion at different viewing angles. FIG. 50 shows a lateral color curve of the camera lens assembly according to Embodiment 10, representing deviations of different image heights on an image plane after light passes through the camera lens assembly. In summary and referring to FIG. 47 to FIG. 50, it may be seen that the camera lens assembly according to Embodiment 10 is a miniaturized camera lens assembly having high resolution.

Embodiment 11

A camera lens assembly according to Embodiment 11 of the present disclosure is described below with reference to FIG. 51 to FIG. 55.

FIG. 51 is a schematic structural diagram illustrating the camera lens assembly of Embodiment 11. The camera lens assembly from an object side to an image side sequentially includes a first lens E1, a second lens E2, a third lens E3, a fourth lens E4, a fifth lens E5, and a sixth lens E6.

Table 31 below shows the effective focal lengths f1 to f6 of the first to sixth lenses E1 to E6, the total effective focal length f of the camera lens assembly, the total track length TTL of the camera lens assembly and the half of the maximal field-of-view HFOV of the camera lens assembly.

TABLE 31

| f1 (mm) | 5.55 | f (mm) | 10.70 |
| f2 (mm) | -7.65 | TTL (mm) | 11.38 |
| f3 (mm) | -61.19 | HFOV (deg) | 16.5 |
| f4 (mm) | 8.12 | | |
| f5 (mm) | 215.50 | | |
| f6 (mm) | -12.39 | | |

Table 32 below shows the surface type, the radius of curvature, the thickness, the material and the conic coefficient of each lens of the camera lens assembly in this Embodiment.

TABLE 32

| surface number | surface type | radius of curvature | thickness | material | conic coefficient |
|---|---|---|---|---|---|
| OBJ | spherical | infinite | infinite | | |
| STO | spherical | infinite | -0.5972 | | |
| S1 | aspheric | 3.1939 | 1.3204 | 1.55,56.1 | -0.0418 |
| S2 | aspheric | -51.1088 | 0.0500 | | -48.6690 |
| S3 | aspheric | 6.0052 | 0.7067 | 1.65,23.5 | -0.0568 |
| S4 | aspheric | 2.5856 | 0.2551 | | -0.1047 |
| S5 | aspheric | 3.4519 | 0.7885 | 1.55,56.1 | -0.0791 |
| S6 | aspheric | 2.8764 | 0.8444 | | 0.4337 |
| S7 | aspheric | -5.0309 | 1.5000 | 1.55,56.1 | -1.0508 |
| S8 | aspheric | -2.6058 | 0.1865 | | -0.3225 |
| S9 | aspheric | -2.9844 | 0.6000 | 1.65,23.5 | 0.2387 |
| S10 | aspheric | -3.1524 | 0.6785 | | -0.6922 |
| S11 | aspheric | -4.4191 | 0.6000 | 1.55,56.1 | 0.0398 |
| S12 | aspheric | -13.3311 | 0.0500 | | 8.0420 |
| S13 | spherical | infinite | 0.3000 | 1.52,64.2 | |
| S14 | spherical | infinite | 3.5011 | | |
| S15 | spherical | infinite | | | |

Table 33 below shows the higher-order coefficients $A_4$, $A_6$, $A_8$, $A_{10}$ and $A_{12}$ applicable to the aspheric surfaces S1-S12 of the aspheric lenses in this Embodiment.

TABLE 33

| surface number | A4 | A6 | A8 | A10 | A12 |
|---|---|---|---|---|---|
| S1 | -3.8890E-04 | -6.4793E-05 | 6.7438E-06 | 4.6436E-07 | -1.1996E-06 |
| S2 | 5.3486E-04 | -1.3958E-05 | -1.9700E-05 | -3.1336E-06 | 2.7803E-07 |
| S3 | -4.4740E-03 | -5.3033E-05 | 4.2489E-06 | 1.8865E-06 | 2.0131E-06 |
| S4 | -4.3761E-03 | -2.7775E-04 | 3.8056E-05 | 6.8865E-05 | 1.7621E-05 |
| S5 | -1.3799E-04 | 4.2396E-04 | 1.5496E-04 | 1.7304E-05 | 7.7076E-07 |
| S6 | 7.3744E-04 | 2.3237E-03 | 5.0857E-04 | 9.3822E-05 | -4.1261E-05 |
| S7 | -6.5911E-04 | 8.3321E-04 | 2.5871E-04 | -2.0272E-05 | -1.8334E-05 |
| S8 | 1.0377E-02 | -6.7727E-04 | -1.4345E-04 | -2.7071E-05 | -1.4230E-05 |
| S9 | 7.6549E-03 | 8.2860E-05 | -1.3161E-04 | -6.4366E-05 | -1.1469E-05 |
| S10 | 2.9464E-03 | 8.3490E-05 | -9.1402E-05 | -2.0771E-05 | -2.8893E-06 |
| S11 | 3.2007E-03 | -6.7525E-04 | -3.2998E-05 | 8.9614E-06 | -2.3566E-06 |
| S12 | -6.5549E-03 | -3.2137E-05 | 1.1242E-05 | -4.1060E-06 | 1.9075E-07 |

Figure 54:
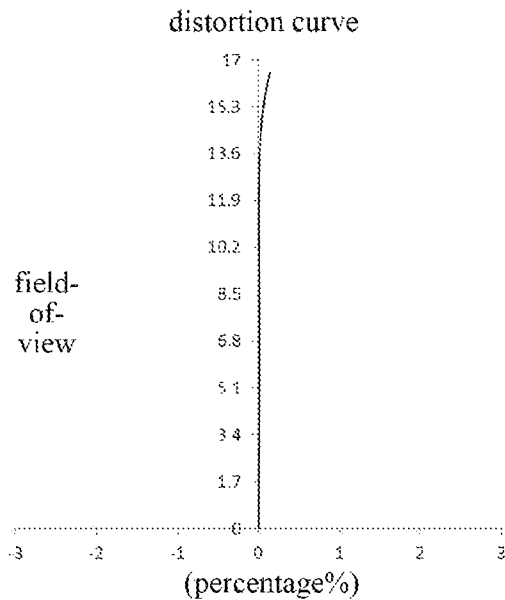
Figure 55:
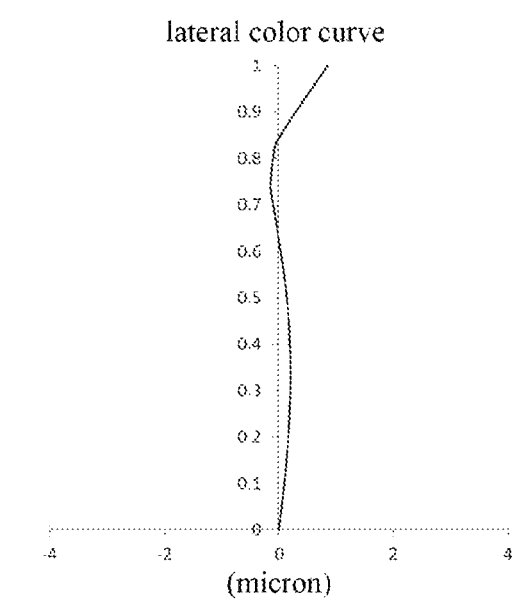

FIG. 52 shows a longitudinal aberration curve of the camera lens assembly according to Embodiment 11, representing deviations of focal points of light of different wavelengths converged after passing through an optical system. FIG. 53 shows an astigmatic curve of the camera lens assembly according to Embodiment 11, representing a curvature of a tangential image plane and a curvature of a sagittal image plane. FIG. 54 shows a distortion curve of the camera lens assembly according to Embodiment 11, representing amounts of distortion at different viewing angles. FIG. 55 shows a lateral color curve of the camera lens assembly according to Embodiment 11, representing deviations of different image heights on an image plane after light passes through the camera lens assembly. In summary and referring to FIG. 52 to FIG. 55, it may be seen that the camera lens assembly according to Embodiment 11 is a miniaturized camera lens assembly having high resolution.

Embodiment 12

A camera lens assembly according to Embodiment 12 of the present disclosure is described below with reference to FIG. 56 to FIG. 60.

Figure 56:
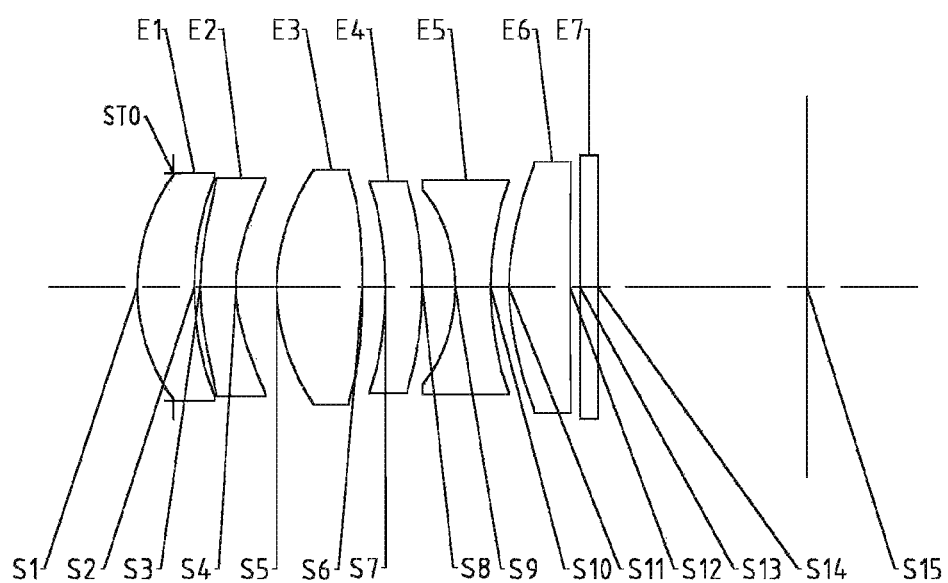
FIG. 56 is a schematic structural diagram illustrating a camera lens assembly according to Embodiment 12.

FIG. 56 is a schematic structural diagram illustrating the camera lens assembly of Embodiment 12. The camera lens assembly from an object side to an image side sequentially includes a first lens E1, a second lens E2, a third lens E3, a fourth lens E4, a fifth lens E5, and a sixth lens E6.

Table 34 below shows the effective focal lengths f1 to f6 of the first to sixth lenses E1 to E6, the total effective focal length f of the camera lens assembly, the total track length TTL of the camera lens assembly and the half of the maximal field-of-view HFOV of the camera lens assembly.

TABLE 34

| f1 (mm) | 12.38 | f (mm) | 10.71 |
|---|---|---|---|
| f2 (mm) | −10.69 | TTL (mm) | 11.17 |
| f3 (mm) | 4.90 | HFOV (deg) | 16.2 |
| f4 (mm) | 53.38 | | |
| f5 (mm) | −3.37 | | |
| f6 (mm) | 8.32 | | |

Table 35 below shows the surface type, the radius of curvature, the thickness, the material and the conic coefficient of each lens of the camera lens assembly in this Embodiment.

TABLE 35

| surface number | surface type | radius of curvature | thickness | material | conic coefficient |
|---|---|---|---|---|---|
| OBJ | spherical | infinite | infinite | | |
| STO | spherical | infinite | −0.6035 | | |
| S1 | aspheric | 3.2650 | 0.9528 | 1.55,56.1 | 0.0349 |
| S2 | aspheric | 5.6583 | 0.0500 | | 1.1104 |
| S3 | aspheric | 4.1988 | 0.6000 | 1.66,21.5 | 0.5909 |
| S4 | aspheric | 2.4801 | 0.6811 | | −0.0423 |
| S5 | aspheric | 3.2152 | 1.4366 | 1.55,56.1 | −0.0773 |
| S6 | aspheric | −13.4601 | 0.3821 | | −4.4558 |
| S7 | aspheric | −7.2431 | 0.6202 | 1.65,23.5 | 0.3472 |
| S8 | aspheric | −6.1871 | 0.5495 | | −6.7187 |
| S9 | aspheric | −2.9267 | 0.6000 | 1.55,56.1 | −0.2314 |
| S10 | aspheric | 5.3468 | 0.3042 | | 0.6659 |
| S11 | aspheric | 4.0841 | 1.0219 | 1.55,56.1 | −3.2544 |
| S12 | aspheric | 36.5798 | 0.1664 | | −99.0000 |
| S13 | spherical | infinite | 0.3000 | 1.52,64.2 | |
| S14 | spherical | infinite | 3.5010 | | |
| S15 | spherical | infinite | | | |

Table 36 below shows the higher-order coefficients $A_4$, $A_6$, $A_8$, $A_{10}$ and $A_{12}$ applicable to the aspheric surfaces S1-S12 of the aspheric lenses in this Embodiment.

TABLE 36

| surface number | A4 | A6 | A8 | A10 | A12 |
|---|---|---|---|---|---|
| S1 | 3.4751E−04 | 3.3873E−05 | 1.7358E−05 | −9.4867E−07 | −3.9012E−07 |
| S2 | 1.8340E−03 | 1.1546E−04 | 2.4561E−05 | 1.1743E−05 | −4.5024E−06 |
| S3 | −1.5826E−02 | 3.9492E−04 | 6.9305E−05 | −1.2679E−06 | −2.5760E−06 |
| S4 | −2.6253E−02 | 1.2392E−04 | 3.1684E−05 | 2.1565E−05 | −6.0051E−06 |
| S5 | −3.0881E−03 | −3.8262E−04 | 7.2021E−05 | 1.0180E−05 | −3.8558E−07 |
| S6 | −5.8771E−03 | −4.7511E−04 | −6.9471E−05 | 1.7755E−05 | 4.2560E−06 |
| S7 | −3.6403E−03 | −2.8311E−04 | −2.2779E−04 | −1.6777E−05 | 2.8065E−05 |
| S8 | −2.4762E−03 | 1.0435E−04 | −2.2718E−04 | −5.8781E−05 | 2.9307E−05 |
| S9 | −1.7786E−03 | −1.7484E−03 | −3.6073E−04 | 5.8677E−05 | −1.5186E−05 |
| S10 | −5.3958E−03 | 1.2324E−03 | 2.1823E−04 | −4.4541E−05 | −3.1605E−06 |
| S11 | −6.7707E−03 | 8.3006E−04 | 8.0132E−05 | 1.4938E−05 | −2.8605E−06 |
| S12 | −1.3508E−03 | −7.9113E−04 | 9.1867E−05 | 6.7090E−06 | 7.4888E−07 |

Figure 57:
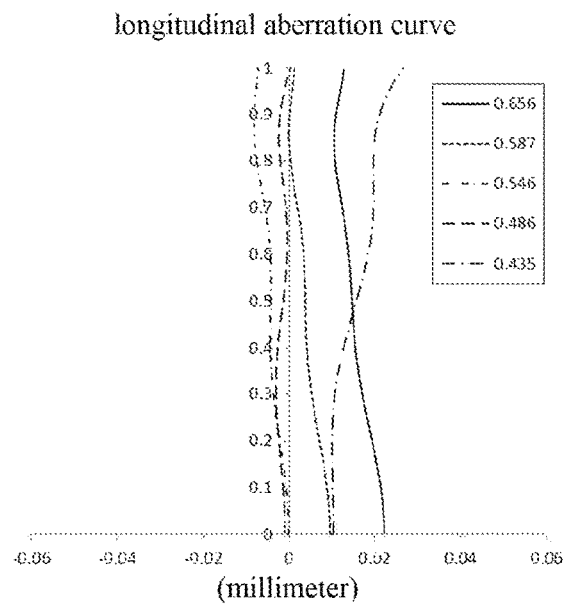
FIGS. 57-60 respectively illustrate a longitudinal aberration curve, an astigmatic curve, a distortion curve and a lateral color curve of the camera lens assembly according to Embodiment 12.
Figure 58:
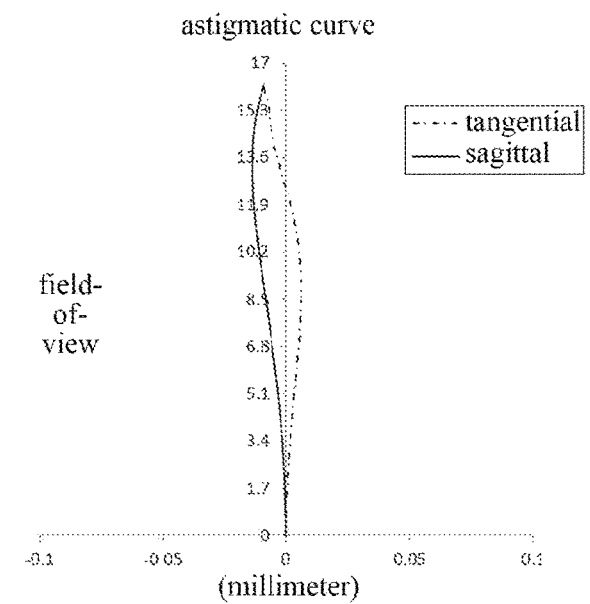
Figure 59:
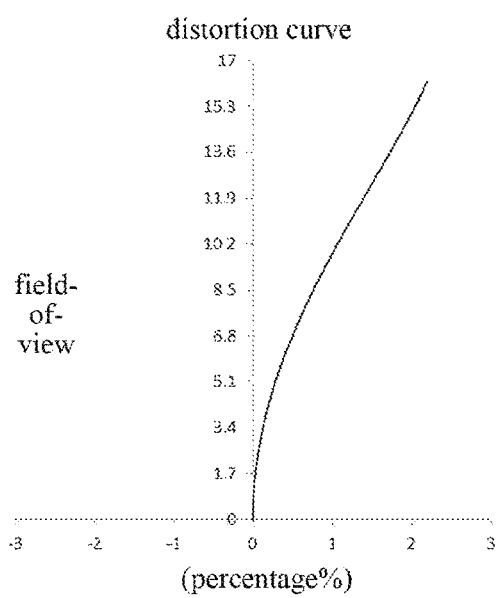
Figure 60:
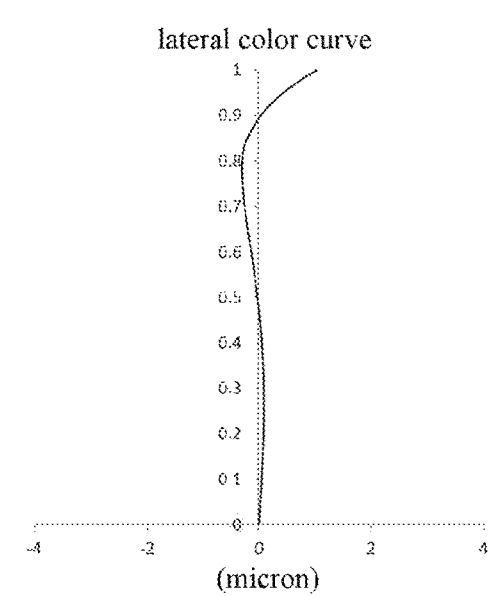

FIG. 57 shows a longitudinal aberration curve of the camera lens assembly according to Embodiment 12, representing deviations of focal points of light of different wavelengths converged after passing through an optical system. FIG. 58 shows an astigmatic curve of the camera lens assembly according to Embodiment 12, representing a curvature of a tangential image plane and a curvature of a sagittal image plane. FIG. 59 shows a distortion curve of the camera lens assembly according to Embodiment 12, representing amounts of distortion at different viewing angles. FIG. 60 shows a lateral color curve of the camera lens assembly according to Embodiment 12, representing deviations of different image heights on an image plane after light passes through the camera lens assembly. In summary and referring to FIG. 57 to FIG. 60, it may be seen that the camera lens assembly according to Embodiment 12 is a miniaturized camera lens assembly having high resolution.

Embodiment 13

A camera lens assembly according to Embodiment 13 of the present disclosure is described below with reference to FIG. 61 to FIG. 65.

FIG. 61 is a schematic structural diagram illustrating the camera lens assembly of Embodiment 13. The camera lens assembly from an object side to an image side sequentially includes a first lens E1, a second lens E2, a third lens E3, a fourth lens E4, a fifth lens E5, and a sixth lens E6.

Table 37 below shows the effective focal lengths f1 to f6 of the first to sixth lenses E1 to E6, the total effective focal length f of the camera lens assembly, the total track length TTL of the camera lens assembly and the half of the maximal field-of-view HFOV of the camera lens assembly.

TABLE 37

| f1 (mm) | 5.62 | f (mm) | 10.70 |
|---|---|---|---|
| f2 (mm) | −6.04 | TTL (mm) | 11.42 |
| f3 (mm) | −73.51 | HFOV (deg) | 16.4 |
| f4 (mm) | 6.96 | | |
| f5 (mm) | −9.66 | | |
| f6 (mm) | 57.67 | | |

Table 38 below shows the surface type, the radius of curvature, the thickness, the material and the conic coefficient of each lens of the camera lens assembly in this Embodiment.

TABLE 38

| surface number | surface type | radius of curvature | thickness | material | conic coefficient |
|---|---|---|---|---|---|
| OBJ | spherical | infinite | infinite | | |
| STO | spherical | infinite | −0.5613 | | |
| S1 | aspheric | 3.2956 | 1.3738 | 1.55,56.1 | −0.0930 |
| S2 | aspheric | −38.7322 | 0.0500 | | 50.0000 |

TABLE 38-continued

| surface number | surface type | radius of curvature | thickness | material | conic coefficient |
|---|---|---|---|---|---|
| S3 | aspheric | 7.1222 | 1.1984 | 1.65,23.5 | −0.2033 |
| S4 | aspheric | 2.3551 | 0.3692 | | −0.0632 |
| S5 | aspheric | 4.2221 | 0.6000 | 1.55,56.1 | −0.5252 |
| S6 | aspheric | 3.6287 | 0.8404 | | 1.1756 |
| S7 | aspheric | −5.5661 | 1.3413 | 1.55,56.1 | 2.8700 |
| S8 | aspheric | −2.4522 | 0.3111 | | −0.4436 |
| S9 | aspheric | −7.8074 | 0.6000 | 1.55,56.1 | 0.2977 |
| S10 | aspheric | 16.7357 | 0.0500 | | 50.0000 |
| S11 | aspheric | 8.0630 | 0.6561 | 1.65,23.5 | −8.3463 |
| S12 | aspheric | 9.9609 | 0.2257 | | −56.0606 |
| S13 | spherical | infinite | 0.3000 | 1.52,64.2 | |
| S14 | spherical | infinite | 3.5006 | | |
| S15 | spherical | infinite | | | |

Table 39 below shows the higher-order coefficients $A_4$, $A_6$, $A_8$, $A_{10}$ and $A_{12}$ applicable to the aspheric surfaces S1-S12 of the aspheric lenses in this Embodiment.

TABLE 39

| surface number | A4 | A6 | A8 | A10 | A12 |
|---|---|---|---|---|---|
| S1 | −6.0229E−04 | −1.2169E−04 | −2.0772E−06 | −3.6413E−06 | −1.0487E−06 |
| S2 | 1.7141E−04 | −1.3893E−04 | −2.5853E−05 | −2.3188E−07 | 1.3710E−07 |
| S3 | −3.0434E−03 | −2.8924E−05 | 2.0139E−05 | 4.5605E−06 | 1.5725E−06 |
| S4 | −5.0099E−03 | −8.8054E−05 | 2.3640E−05 | 1.4229E−04 | 4.0746E−05 |
| S5 | −1.8100E−03 | 1.0735E−03 | 4.5393E−04 | 1.2291E−04 | −1.5569E−05 |
| S6 | 1.5597E−03 | 3.1222E−03 | 8.9380E−04 | 9.3894E−05 | −1.3190E−04 |
| S7 | 2.9860E−03 | 1.2284E−03 | 3.1085E−04 | 2.7340E−06 | −7.5046E−05 |
| S8 | 1.1433E−02 | −8.5106E−04 | −1.2377E−04 | 1.4322E−05 | −1.7391E−05 |
| S9 | 2.8041E−03 | 3.3386E−04 | −1.0026E−04 | −3.2155E−05 | 1.2035E−05 |
| S10 | −9.3645E−03 | 4.2413E−05 | 1.7843E−05 | 4.8394E−06 | −1.6324E−06 |
| S11 | −8.5831E−03 | 4.7107E−04 | 8.0435E−05 | −2.9914E−07 | −2.8811E−06 |
| S12 | −6.5245E−03 | 5.2663E−04 | 3.7091E−05 | −4.0703E−06 | −6.7887E−07 |

Figure 64:
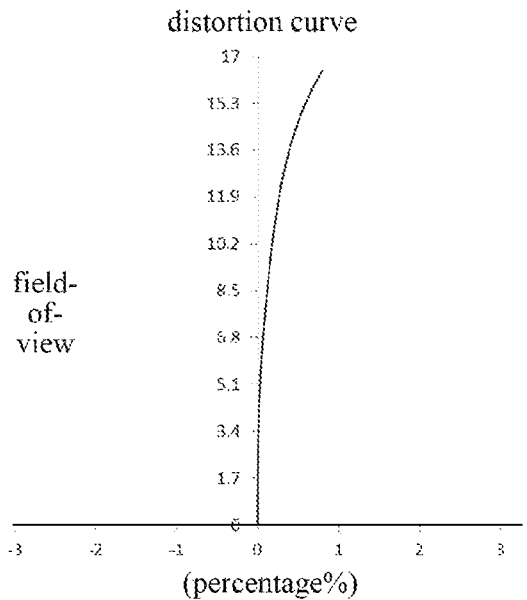
Figure 65:
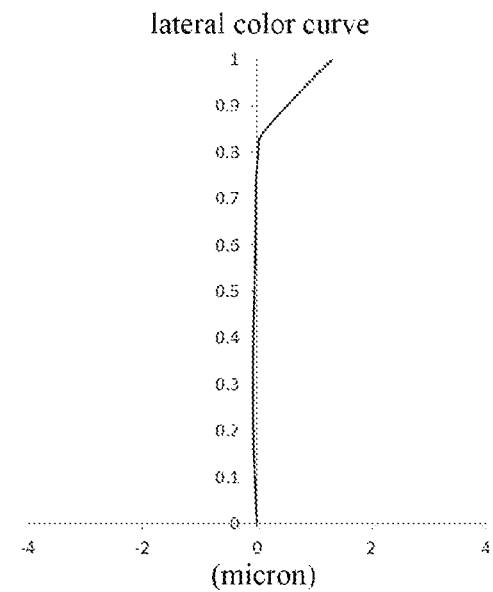

FIG. 62 shows a longitudinal aberration curve of the camera lens assembly according to Embodiment 13, representing deviations of focal points of light of different wavelengths converged after passing through an optical system. FIG. 63 shows an astigmatic curve of the camera lens assembly according to Embodiment 13, representing a curvature of a tangential image plane and a curvature of a sagittal image plane. FIG. 64 shows a distortion curve of the camera lens assembly according to Embodiment 13, representing amounts of distortion at different viewing angles. FIG. 65 shows a lateral color curve of the camera lens assembly according to Embodiment 13, representing deviations of different image heights on an image plane after light passes through the camera lens assembly. In summary and referring to FIG. 62 to FIG. 65, it may be seen that the camera lens assembly according to Embodiment 13 is a miniaturized camera lens assembly having high resolution.

Embodiment 14

A camera lens assembly according to Embodiment 14 of the present disclosure is described below with reference to FIG. 66 to FIG. 70.

Figure 66:
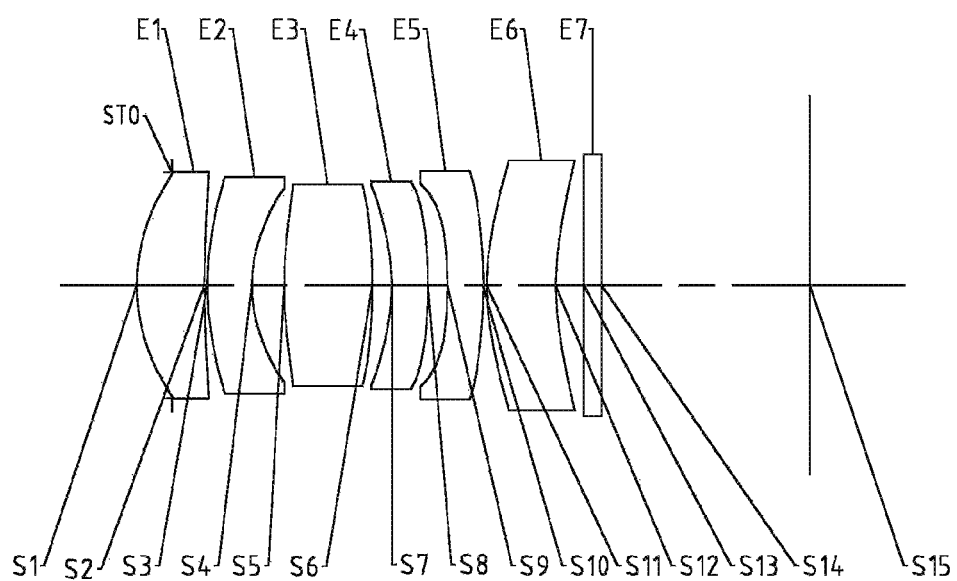
FIG. 66 is a schematic structural diagram illustrating a camera lens assembly according to Embodiment 14.

FIG. 66 is a schematic structural diagram illustrating the camera lens assembly of Embodiment 14. The camera lens assembly from an object side to an image side sequentially includes a first lens E1, a second lens E2, a third lens E3, a fourth lens E4, a fifth lens E5, and a sixth lens E6.

Table 40 below shows the effective focal lengths f1 to f6 of the first to sixth lenses E1 to E6, the total effective focal length f of the camera lens assembly, the total track length TTL of the camera lens assembly and the half of the maximal field-of-view HFOV of the camera lens assembly.

TABLE 40

| f1 (mm) | 7.06 | f (mm) | 10.70 |
|---|---|---|---|
| f2 (mm) | −8.29 | TTL (mm) | 11.32 |
| f3 (mm) | 8.04 | HFOV (deg) | 16.3 |
| f4 (mm) | −8.44 | | |
| f5 (mm) | 180.00 | | |
| f6 (mm) | 42.80 | | |

Table 41 below shows the surface type, the radius of curvature, the thickness, the material and the conic coefficient of each lens of the camera lens assembly in this Embodiment.

TABLE 38

| surface number | surface type | radius of curvature | thickness | material | conic coefficient |
|---|---|---|---|---|---|
| OBJ | spherical | infinite | infinite | | |
| STO | spherical | infinite | −0.5873 | | |
| S1 | aspheric | 3.1516 | 1.1323 | 1.55,56.1 | −0.0762 |
| S2 | aspheric | 15.0434 | 0.0500 | | −16.0075 |
| S3 | aspheric | 4.8233 | 0.7506 | 1.66,21.5 | 0.4409 |
| S4 | aspheric | 2.4024 | 0.5425 | | −0.1475 |
| S5 | aspheric | 6.3954 | 1.4840 | 1.55,56.1 | −7.7332 |
| S6 | aspheric | −12.9005 | 0.3344 | | −99.0000 |
| S7 | aspheric | −3.2286 | 0.6000 | 1.55,56.1 | −2.9464 |
| S8 | aspheric | −11.4692 | 0.3319 | | −17.4971 |
| S9 | aspheric | −8.0969 | 0.6068 | 1.55,56.1 | −99.0000 |
| S10 | aspheric | −7.6793 | 0.0500 | | 10.2136 |
| S11 | aspheric | 4.0565 | 1.1587 | 1.65,23.5 | −15.8480 |
| S12 | aspheric | 4.2210 | 0.4768 | | −13.3882 |
| S13 | spherical | infinite | 0.3000 | 1.52,64.2 | |
| S14 | spherical | infinite | 3.5010 | | |
| S15 | spherical | infinite | | | |

Table 42 below shows the higher-order coefficients $A_4$, $A_6$, $A_8$, $A_{10}$ and $A_{12}$ applicable to the aspheric surfaces S1-S12 of the aspheric lenses in this Embodiment.

TABLE 42

| surface number | A4 | A6 | A8 | A10 | A12 |
|---|---|---|---|---|---|
| S1 | −5.3331E−04 | −2.1985E−04 | −4.3033E−06 | −1.2433E−05 | −5.7798E−07 |
| S2 | −1.1211E−03 | −4.4274E−04 | −9.1357E−06 | 7.3989E−07 | 1.9689E−07 |
| S3 | −8.8290E−03 | 5.7114E−04 | 6.8026E−05 | 9.8164E−06 | −2.4886E−06 |
| S4 | −1.5980E−02 | 4.7830E−04 | 2.7351E−04 | 6.0189E−05 | −1.4640E−06 |
| S5 | −7.1454E−03 | −1.8062E−03 | 3.4837E−04 | 1.1598E−04 | 1.2922E−05 |
| S6 | −9.0691E−03 | −3.4096E−04 | −1.0000E−05 | 3.9916E−05 | −9.9225E−06 |
| S7 | 1.4026E−02 | −1.5386E−03 | −3.8933E−04 | −3.2794E−05 | −1.3688E−05 |
| S8 | −1.8129E−02 | 3.2705E−03 | −3.3919E−04 | −1.8087E−04 | −1.0516E−05 |
| S9 | −3.5146E−02 | −6.2024E−04 | 3.8068E−04 | −1.5322E−04 | −4.2282E−05 |
| S10 | 1.2275E−02 | −1.7576E−03 | −8.8156E−05 | −6.9426E−06 | 8.4097E−06 |
| S11 | 2.5550E−03 | 1.2526E−04 | −1.0423E−04 | 7.1334E−06 | 3.1318E−07 |
| S12 | −4.9652E−03 | 1.0320E−03 | 3.3460E−05 | −2.8232E−05 | 2.5048E−06 |

Figure 67:
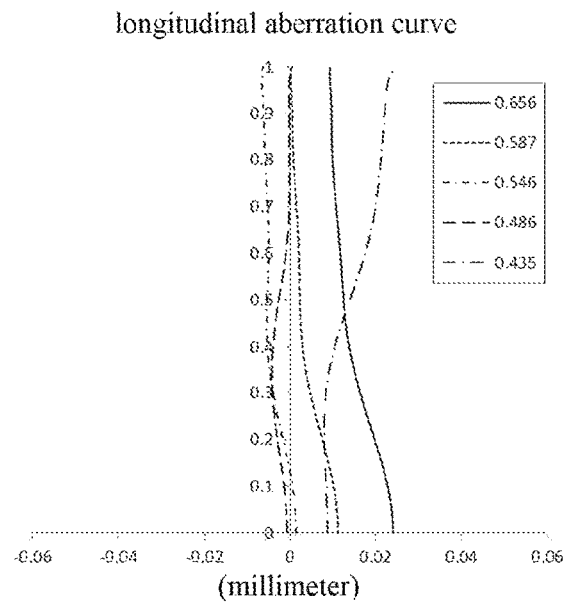
FIGS. 67-70 respectively illustrate a longitudinal aberration curve, an astigmatic curve, a distortion curve and a lateral color curve of the camera lens assembly according to Embodiment 14.
Figure 68:
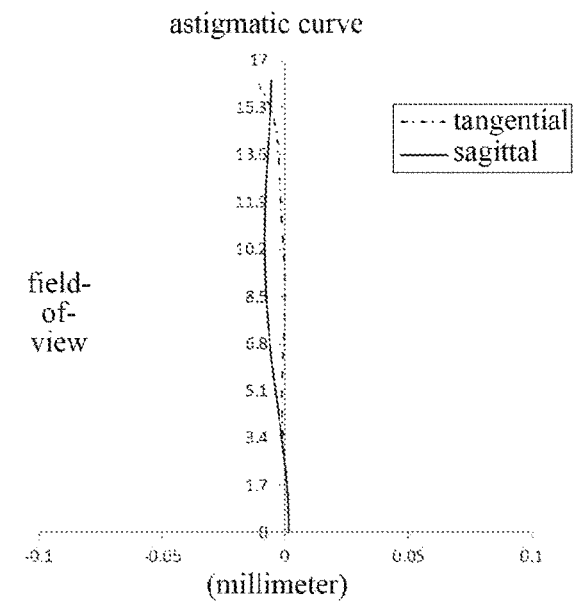
Figure 69:
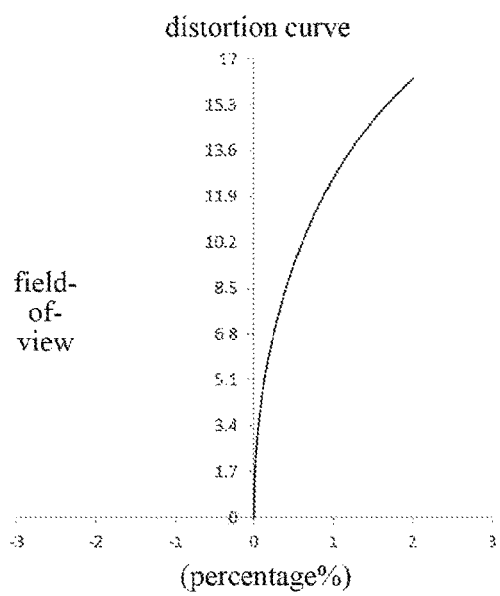
Figure 70:
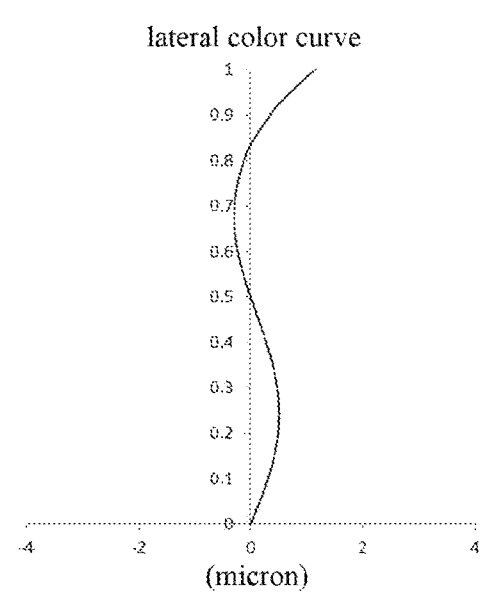

FIG. 67 shows a longitudinal aberration curve of the camera lens assembly according to Embodiment 14, representing deviations of focal points of light of different wavelengths converged after passing through an optical system. FIG. 68 shows an astigmatic curve of the camera lens assembly according to Embodiment 14, representing a curvature of a tangential image plane and a curvature of a sagittal image plane. FIG. 69 shows a distortion curve of the camera lens assembly according to Embodiment 14, representing amounts of distortion at different viewing angles. FIG. 70 shows a lateral color curve of the camera lens assembly according to Embodiment 14, representing deviations of different image heights on an image plane after light passes through the camera lens assembly. In summary and referring to FIG. 67 to FIG. 70, it may be seen that the camera lens assembly according to Embodiment 14 is a miniaturized camera lens assembly having high resolution.

Embodiment 15

A camera lens assembly according to Embodiment 15 of the present disclosure is described below with reference to FIG. 71 to FIG. 75.

Figure 71:
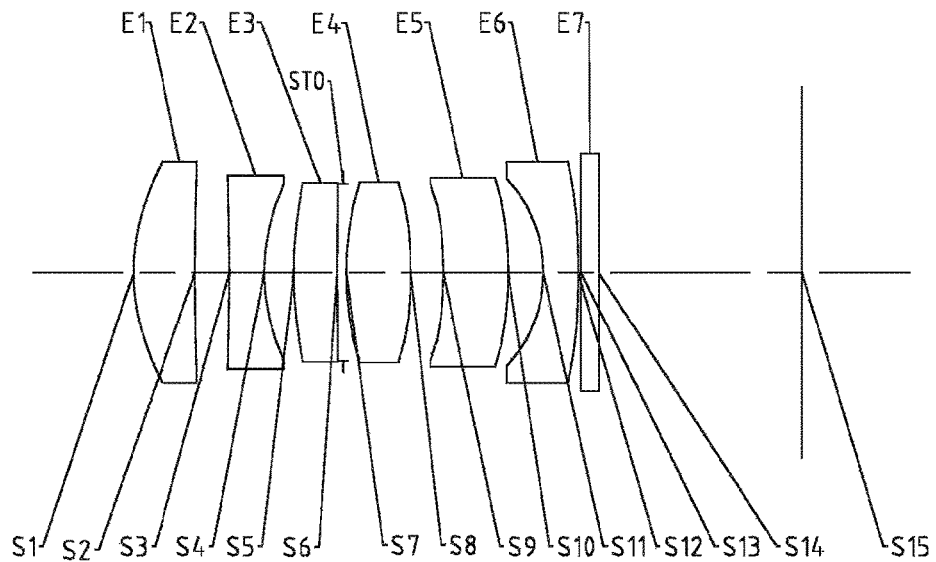
FIG. 71 is a schematic structural diagram illustrating a camera lens assembly according to Embodiment 15.

FIG. 71 is a schematic structural diagram illustrating the camera lens assembly of Embodiment 15. The camera lens assembly from an object side to an image side sequentially includes a first lens E1, a second lens E2, a third lens E3, a fourth lens E4, a fifth lens E5, and a sixth lens E6.

Table 43 below shows the effective focal lengths f1 to f6 of the first to sixth lenses E1 to E6, the total effective focal length f of the camera lens assembly, the total track length TTL of the camera lens assembly and the half of the maximal field-of-view HFOV of the camera lens assembly.

TABLE 43

| f1 (mm) | 6.99 | f (mm) | 10.70 |
|---|---|---|---|
| f2 (mm) | −4.61 | TTL (mm) | 11.50 |
| f3 (mm) | 10.53 | HFOV (deg) | 16.6 |
| f4 (mm) | 6.66 | | |
| f5 (mm) | 44.81 | | |
| f6 (mm) | −5.51 | | |

Table 44 below shows the surface type, the radius of curvature, the thickness, the material and the conic coefficient of each lens of the camera lens assembly in this Embodiment.

TABLE 44

| surface number | surface type | radius of curvature | thickness | material | conic coefficient |
|---|---|---|---|---|---|
| OBJ | spherical | infinite | infinite | | |
| S1 | aspheric | 3.7545 | 1.0621 | 1.55,56.1 | 0.5705 |
| S2 | aspheric | 195.9543 | 0.5892 | | −99.0000 |
| S3 | aspheric | −25.3038 | 0.6000 | 1.65,23.5 | 49.5450 |
| S4 | aspheric | 3.4073 | 0.5056 | | 0.1237 |
| S5 | aspheric | 6.8058 | 0.7467 | 1.65,23.5 | −6.6917 |
| S6 | aspheric | infinite | 0.1054 | | −24.5000 |
| STO | spherical | infinite | 0.0500 | | |
| S7 | aspheric | 5.5861 | 1.1055 | 1.55,56.1 | 2.4793 |
| S8 | aspheric | −9.7033 | 0.5613 | | 17.0183 |
| S9 | aspheric | −8.8399 | 1.1237 | 1.55,56.1 | 7.0808 |
| S10 | aspheric | −6.7869 | 0.6004 | | −11.6570 |
| S11 | aspheric | −2.5702 | 0.6000 | 1.65,23.5 | 0.4785 |
| S12 | aspheric | −18.8995 | 0.0500 | | 50.0000 |
| S13 | spherical | infinite | 0.3000 | 1.55,56.1 | |
| S14 | spherical | infinite | 3.5008 | | |
| S15 | spherical | infinite | | | |

Table 45 below shows the higher-order coefficients $A_4$, $A_6$, $A_8$, $A_{10}$ and $A_{12}$ applicable to the aspheric surfaces S1-S12 of the aspheric lenses in this Embodiment.

TABLE 45

| surface number | A4 | A6 | A8 | A10 | A12 |
|---|---|---|---|---|---|
| S1 | −2.2307E−03 | −1.9118E−04 | −4.5142E−05 | −5.1251E−06 | −2.5730E−06 |
| S2 | 5.7668E−03 | −5.9566E−04 | −1.1476E−04 | −3.1332E−05 | 4.8629E−06 |
| S3 | 7.0305E−03 | −1.0958E−03 | −1.8096E−04 | 4.1997E−05 | 9.2451E−07 |
| S4 | −7.0107E−03 | 6.0212E−04 | 8.0690E−05 | 6.5540E−05 | −2.7974E−07 |
| S5 | −3.2055E−03 | −5.4238E−04 | 5.9844E−04 | 3.2250E−05 | −3.1130E−05 |
| S6 | 1.0634E−03 | −1.2644E−04 | 9.4318E−05 | 1.1325E−04 | −4.0702E−05 |
| S7 | −1.4788E−03 | 7.3604E−04 | −1.9904E−04 | −1.2754E−05 | 1.1968E−05 |
| S8 | −1.4283E−02 | 4.2983E−04 | 1.3696E−04 | −6.5299E−06 | 1.4153E−05 |
| S9 | −1.2785E−02 | −2.0944E−03 | 1.2276E−04 | 2.2311E−04 | −2.6827E−05 |
| S10 | −7.6866E−04 | −2.9457E−03 | −4.5209E−05 | 1.1999E−04 | −1.6827E−05 |

TABLE 45-continued

| surface number | A4 | A6 | A8 | A10 | A12 |
|---|---|---|---|---|---|
| S11 | −2.8545E−03 | −8.4718E−04 | 2.4333E−04 | 3.1159E−05 | 2.0000E−05 |
| S12 | −9.7018E−03 | 1.4345E−03 | −1.3216E−05 | 4.2883E−06 | −6.0457E−07 |

Figures 72, 73:
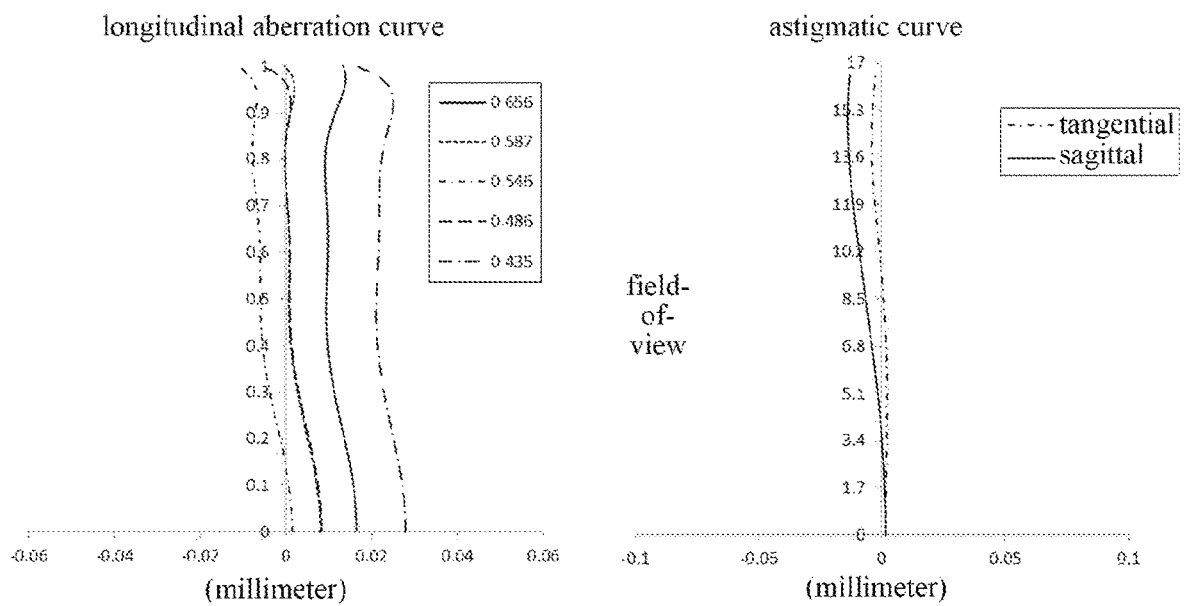
FIGS. 72-75 respectively illustrate a longitudinal aberration curve, an astigmatic curve, a distortion curve and a lateral color curve of the camera lens assembly according to Embodiment 15.
Figure 74:
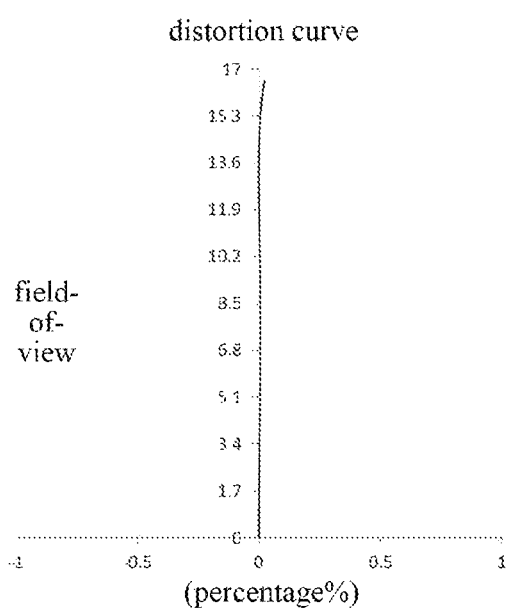
Figure 75:
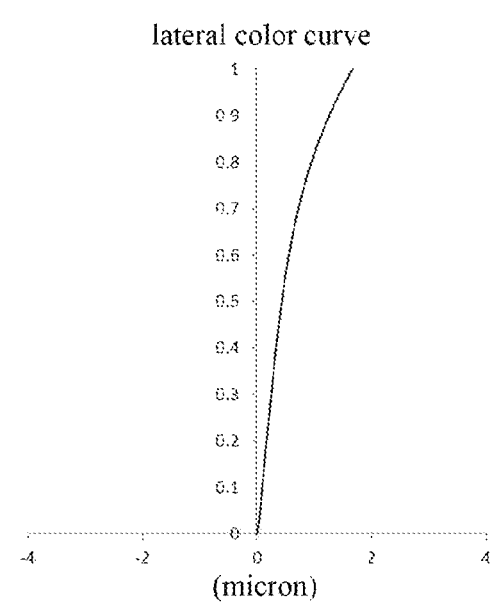

FIG. 72 shows a longitudinal aberration curve of the camera lens assembly according to Embodiment 15, representing deviations of focal points of light of different wavelengths converged after passing through an optical system. FIG. 73 shows an astigmatic curve of the camera lens assembly according to Embodiment 15, representing a curvature of a tangential image plane and a curvature of a sagittal image plane. FIG. 74 shows a distortion curve of the camera lens assembly according to Embodiment 15, representing amounts of distortion at different viewing angles. FIG. 75 shows a lateral color curve of the camera lens assembly according to Embodiment 15, representing deviations of different image heights on an image plane after light passes through the camera lens assembly. In summary and referring to FIG. 72 to FIG. 75, it may be seen that the camera lens assembly according to Embodiment 15 is a miniaturized camera lens assembly having high resolution.

To sum up, in the above Embodiments 1 to 15, the conditional formulas satisfy the conditions shown in Table 46 below.

TABLE 46

| Conditional Formula | Embodiment | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| HFOV | 16.4 | 16.6 | 16.6 | 16.6 | 16.2 | 16.2 | 16.2 | 16.3 | 16.2 | 16.3 | 16.5 | 16.2 | 16.4 | 16.3 | 16.6 |
| DT11/DT62 | 1.11 | 0.91 | 0.91 | 0.87 | 0.95 | 0.95 | 1.00 | 0.95 | 0.91 | 0.95 | 0.87 | 0.91 | 0.87 | 0.91 | 1.00 |
| BFL/TTL | 0.41 | 0.29 | 0.30 | 0.29 | 0.33 | 0.36 | 0.34 | 0.35 | 0.35 | 0.34 | 0.34 | 0.36 | 0.35 | 0.38 | 0.33 |
| CTmax/CTmin | 2.96 | 2.50 | 2.42 | 2.15 | 2.00 | 1.93 | 1.93 | 2.03 | 2.32 | 2.07 | 2.50 | 2.40 | 2.28 | 2.47 | 1.87 |
| f1/f | 0.51 | 0.57 | 0.58 | 0.59 | 0.79 | 0.96 | 0.86 | 0.64 | 0.77 | 0.68 | 0.52 | 1.16 | 0.53 | 0.66 | 0.65 |
| f2/f4 | −0.36 | −0.48 | −0.57 | −1.34 | −0.67 | 0.67 | 0.31 | −0.80 | 0.30 | −0.40 | −0.94 | −0.20 | −0.87 | 0.98 | −0.69 |
| |R11|/f | 1.33 | 0.33 | 0.33 | 0.35 | 0.48 | 0.45 | 0.46 | 0.98 | 0.63 | 0.71 | 0.41 | 0.38 | 0.75 | 0.38 | 0.24 |
| |(R1 − R4)/(R1 + R4)| | 0.94 | 0.17 | 0.17 | 0.15 | 0.09 | 0.01 | 0.04 | 0.16 | 0.02 | 0.22 | 0.11 | 0.14 | 0.17 | 0.13 | 0.05 |
| TTL/f | 1.05 | 1.08 | 1.08 | 1.08 | 1.08 | 1.07 | 1.06 | 1.07 | 1.08 | 1.06 | 1.06 | 1.04 | 1.07 | 1.06 | 1.08 |
| f/f12 | 1.02 | 0.93 | 0.93 | 1.02 | 0.36 | 0.28 | 0.18 | 0.64 | 0.36 | 0.29 | 0.95 | 0.05 | 0.79 | 0.59 | −0.26 |

The foregoing is only a description of the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to) technical features with similar functions.

What is claimed is:

1. A camera lens assembly, from an object side of the camera lens assembly to an image side comprising sequentially a first lens, a second lens, a third lens, a fourth lens, a fifth lens and a sixth lens,
   wherein a maximum effective radius DT11 of an object-side surface of the first lens and a maximum effective radius DT62 of an image-side surface of the sixth lens satisfy: 0.8<DT11/DT62<1.2,
   wherein HFOV<20°, and HFOV is half of a maximal field-of-view of the camera lens assembly.

2. The camera lens assembly according to claim 1, wherein,
   the first lens has a positive refractive power, and the object-side surface of the first lens is a convex surface;
   the second lens has a negative refractive power, and an image-side surface of the second lens is a concave surface; and
   each of the third lens, the fourth lens, the fifth lens, and the sixth lens has a refractive power.

3. The camera lens assembly according to claim 1, wherein 0.25<BFL/TTL<0.5, BFL is an axial distance from the image-side surface of the sixth lens to an image plane, and TTL is an axial distance from the object-side surface of the first lens to the image plane.

4. The camera lens assembly according to claim 1, wherein, 1.5<CTmax/CTmin<3.0, CTmax is a maximum center thickness of the first to sixth lenses, and CTmin is a minimum center thickness of the first to sixth lenses.

5. The camera lens assembly according to claim 1, wherein, 0.5<f1/f<1.2, f1 is an effective focal length of the first lens, and f is an effective focal length of the camera lens assembly.

6. The camera lens assembly according to claim 1, wherein, |f2/f4|<1.5, f2 is an effective focal length of the second lens, and f4 is an effective focal length of the fourth lens.

7. The camera lens assembly according to claim 1, wherein, |R11|/f≤1.5, R11 is a radius of curvature of an object-side surface of the sixth lens, and f is an effective focal length of the camera lens assembly.

8. The camera lens assembly according to claim 1, wherein, |(R1−R4)/(R1+R4)|≤1.0, R1 is a radius of curvature of the object-side surface of the first lens, and R4 is a radius of curvature of an image-side surface of the second lens.

9. The camera lens assembly according to claim 1, wherein TTL/f≤1.1, TTL is an axial distance from the object-side surface of the first lens to an image plane, and f is an effective focal length of the camera lens assembly.

10. The camera lens assembly according to claim 1, wherein f/f12<1.2, f12 is a combined focal length of the first lens and the second lens, and f is an effective focal length of the camera lens assembly.

11. A camera lens assembly, from an object side of the camera lens assembly to an image side comprising sequentially a first lens, a second lens, a third lens, a fourth lens, a fifth lens and a sixth lens, wherein |(R1−R4)/(R1+R4)|≤1.0, R1 is a radius of curvature of an object-side surface of the first lens, and R4 is a radius of curvature of an image-side surface of the second lens, wherein HFOV<20°, and HFOV is half of a maximal field-of-view of the camera lens assembly.

12. The camera lens assembly according to claim 11, wherein, the first lens has a positive refractive power, and the object-side surface of the first lens is a convex surface;

the second lens has a negative refractive power, and the image-side surface of the second lens is a concave surface; and each of the third lens, the fourth lens, the fifth lens, and the sixth lens has a refractive power.

13. The camera lens assembly according to claim 12, wherein, a maximum effective radius DT11 of the object-side surface of the first lens and a maximum effective radius DT62 of an image-side surface of the sixth lens satisfy: 0.8<DT11/DT62<1.2.

14. The camera lens assembly according to claim 11, wherein, 0.25<BFL/TTL<0.5, BFL is an axial distance from an image-side surface of the sixth lens to an image plane, and TTL is an axial distance from the object-side surface of the first lens to the image plane.

15. The camera lens assembly according to claim 11, wherein, 1.5<CTmax/CTmin<3.0, CTmax is a maximum center thickness of the first to sixth lenses, and CTmin is a minimum center thickness of the first to sixth lenses.

16. The camera lens assembly according to claim 11, wherein, 0.5<f1/f<1.2, f1 is an effective focal length of the first lens, and f is an effective focal length of the camera lens assembly.

17. The camera lens assembly according to claim 11, wherein, |f2/f4|<1.5, f2 is an effective focal length of the second lens, and f4 is an effective focal length of the fourth lens.

18. The camera lens assembly according to claim 11, wherein, |R11|/f≤1.5, R11 is a radius of curvature of an object-side surface of the sixth lens, and f is an effective focal length of the camera lens assembly.

19. The camera lens assembly according to claim 11, wherein, TTL/f≤1.1, TTL is an axial distance from the object-side surface of the first lens to an image plane, and f is an effective focal length of the camera lens assembly.

\* \* \* \* \*